(12) United States Patent
Choffat et al.

(10) Patent No.: US 12,015,851 B2
(45) Date of Patent: Jun. 18, 2024

(54) SYSTEM AND METHOD FOR VISUAL ENHANCEMENT OF A SCENE DURING CAPTURE THEREOF

(71) Applicant: NEP Supershooters, L.P., Pittsburgh, PA (US)

(72) Inventors: Casper Philippe Henri Choffat, Hilversum (NL); Todd Neville Scrutchfield, Houston, TX (US); Alan Collins, Dublin (IE); Justin Ming Yuan Choy, Hong Kong (CN); Yufei Zhang, Tokyo (JP)

(73) Assignee: NEP Supershooters, L.P., Pittsburgh, PA (US)

( * ) Notice: Subject to any disclaimer, the term of this patent is extended or adjusted under 35 U.S.C. 154(b) by 54 days.

(21) Appl. No.: 17/662,653

(22) Filed: May 9, 2022

(65) Prior Publication Data

US 2022/0360718 A1  Nov. 10, 2022

Related U.S. Application Data

(60) Provisional application No. 63/214,007, filed on Jun. 23, 2021, provisional application No. 63/186,068, filed on May 8, 2021.

(51) Int. Cl.
*H04N 23/695* (2023.01)
*G06T 5/00* (2024.01)
*G06T 7/20* (2017.01)

(52) U.S. Cl.
CPC ............. *H04N 23/695* (2023.01); *G06T 5/00* (2013.01); *G06T 7/20* (2013.01)

(58) Field of Classification Search
CPC .... H04N 23/695; H04N 23/661; G06T 5/001; G06T 7/20
See application file for complete search history.

(56) References Cited

U.S. PATENT DOCUMENTS

2021/0021784 A1* 1/2021 Cutler ................... H04N 23/45

FOREIGN PATENT DOCUMENTS

| KR | 1020180127633 A | 11/2018 |
|---|---|---|
| WO | 2021014716 A1 | 1/2021 |

OTHER PUBLICATIONS

International Search Report and Written Opinion of the International Searching Authority for International Application No. PCT/US22/72220 dated Sep. 7, 2022.

* cited by examiner

*Primary Examiner* — Lin Ye
*Assistant Examiner* — Tuan H Le
(74) *Attorney, Agent, or Firm* — K&L Gates LLP

(57) ABSTRACT

A system. The system includes an image display system, a display device, a camera system, one or more control devices and a control system. The display device is configured to display an image received from the image display system. The camera system is configured to capture the image displayed by the display device during a capture of a scene. The control system is communicably coupled to the image display system, the display device, the camera system and the one or more control devices. The control system comprises a processing circuit and is configured to automatically adjust settings of the image display system, the display device and the camera system. The control system is also configured to determine which of the adjustments results in the least destruction to the image, and apply the adjustment which results in the least destruction to the image.

25 Claims, 14 Drawing Sheets

SYSTEM AND METHOD FOR VISUAL ENHANCEMENT OF A SCENE DURING CAPTURE THEREOF

CROSS-REFERENCE TO RELATED APPLICATION

This application claims the benefit under 35 U.S.C. § 119(e) of the earlier filing dates of U.S. Provisional Patent Application No. 63/186,068 filed on May 8, 2021, titled SYSTEM AND METHOD FOR VISUAL ENHANCEMENT OF A SCENE DURING CAPTURE THEREOF, and of United States Provisional Patent Application No. 63/214,007 filed on Jun. 23, 2021, titled SYSTEM AND METHOD FOR VISUAL ENHANCEMENT OF A SCENE DURING CAPTURE THEREOF, the contents of each of which are hereby incorporated by reference in their entirety.

BACKGROUND

This application discloses an invention that is related, generally and in various aspects, to a system and method for visual enhancement of a scene during the capture of the scene.

Traditionally, enhancements such as color grading and visual effects (VFX) have been performed during times well after a given scene has been shot at a location remote from the location where the given scene was shot, during what is commonly referred to as post-production. The longer the post-production process takes, the longer it takes for a movie, a video, a commercial and the like to be made available to viewers.

With the expanded implementation of various subscription-based services, the providers of such services are under pressure to produce much more content and have it made available to subscribers in much less time than traditional processes. By performing enhancements such as color grading and VFX during the capture phase instead of during the post-production process, the service providers will be able to produce more content in a shorter time frame than has traditionally been realized.

BRIEF DESCRIPTION OF THE DRAWINGS

The novel features of aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
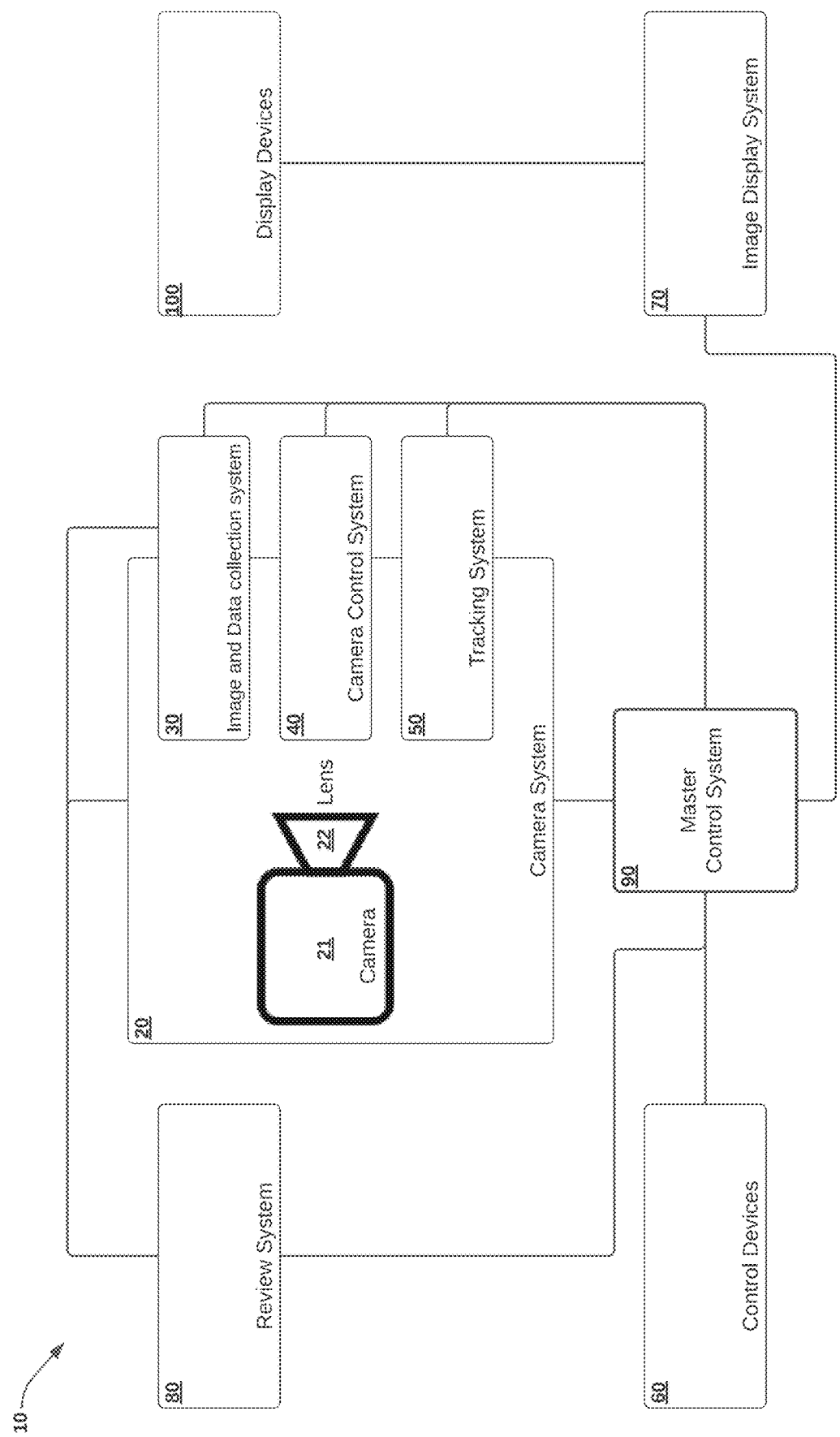
FIG. 1 illustrates a system for visual enhancement of a scene during the capture of the scene, in accordance with at least one aspect of the present disclosure.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings. In the drawings, similar symbols and reference characters typically identify similar components throughout several views, unless context dictates otherwise. The illustrative aspects described in the detailed description, drawings, and claims are not meant to be limiting. Other aspects may be utilized, and other changes may be made, without departing from the scope of the technology described herein.

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the system and method, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations, and modifications thereof, and may be practiced or carried out in various ways. Accordingly, aspects of the system and method disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. The terminology used herein is not meant to be limiting insofar as devices described herein, or portions thereof may be attached or utilized in other orientations. The various aspects will be described in more detail with reference to the drawings.

Aspects of the described invention may be implemented by a computing device and/or a computer program/software/ algorithm stored on a computer-readable medium. The computer-readable medium may comprise a disk, a device, and/or a propagated signal.

FIG. 1 illustrates a system 10 for visual enhancement of a scene during a capture of the scene, in accordance with at least one aspect of the present disclosure. As used herein, the scene refers to any setting to be observed by an audience or captured by still or motion camera system. For example, the scene may be a location, an environment, a stage, a set, a setting, etc., and the scene may be a scene for a motion picture, a television show, a broadcast event, a commercial or an advertisement, a play, an opera, and the like. Although the scene can be any type of scene, for purposes of simplicity, the scene will be described hereinafter in the context of a scene of a motion picture. The system 10 may be utilized to enhance color, lighting, sound, visual effects, automation, mechanics, animations, and other aspects of a scene, and combinations thereof during the capture of the scene.

The system 10 includes a camera system 20, an image and data collection system 30, an image display system 70, one or more display devices 100, one or more control devices 60, a master control system 90, and a review system 80. As shown in FIG. 1, the system 10 may also include a camera control system 40 and a tracking system 50. The system 10 will be described in greater detail hereinbelow with respect to FIG. 2.

Figure 2:
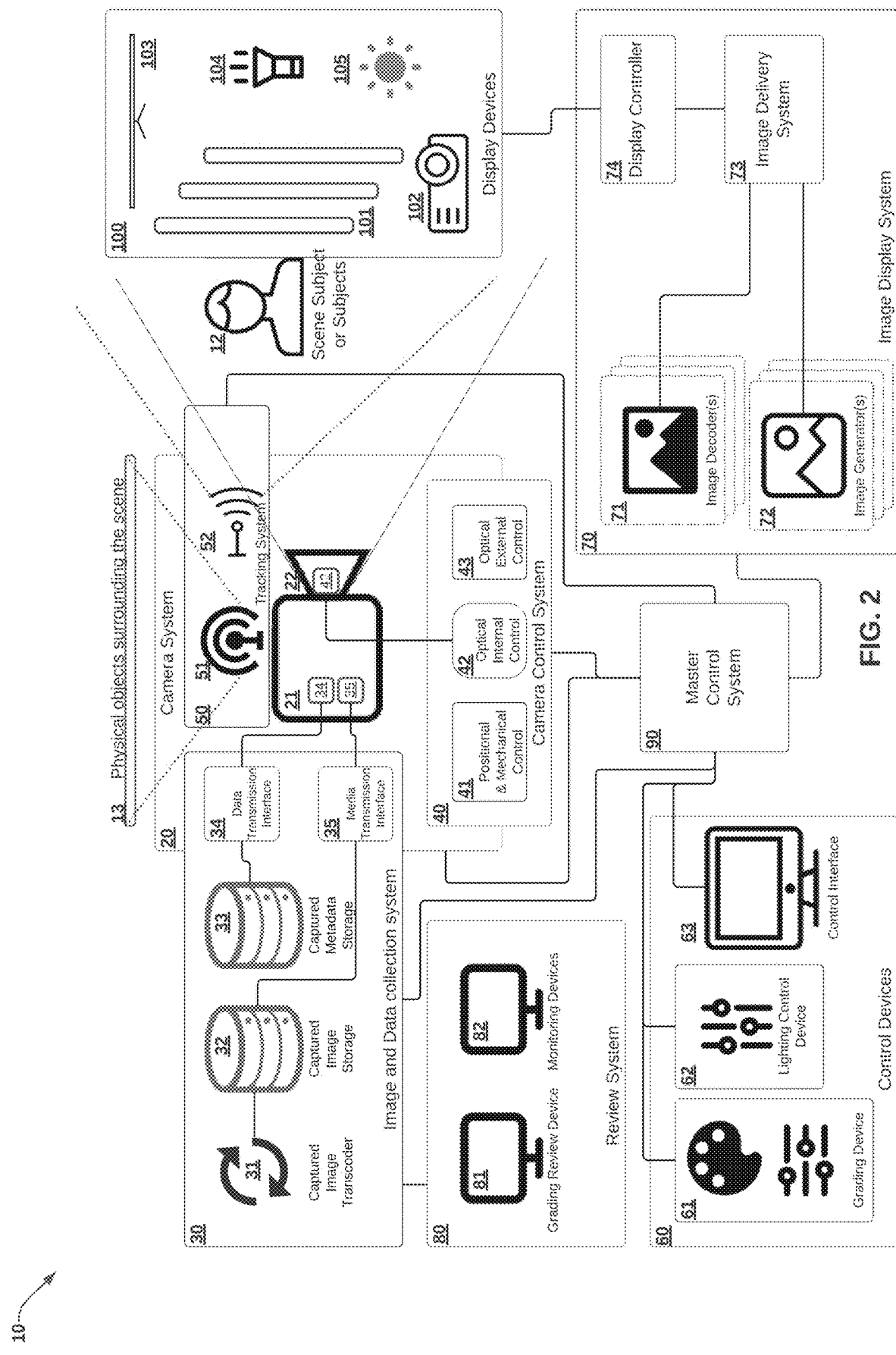
FIG. 2 illustrates a more detailed representation of the system of FIG. 1, in accordance with at least one aspect of the present disclosure.

FIG. 2 illustrates a more detailed representation of the system 10 of FIG. 1, in accordance with at least one aspect of the present disclosure. The camera system 20 includes one or more cameras 21, and may also include the camera control system 40 and/or the tracking system 50. The camera system 20 is utilized to capture a visual state of a scene, and the scene may include source imagery displayed on one or more of the display devices 100 which may or may not be visible to the one or more cameras 21. A given camera 21 of the camera system 20 may be any suitable type of camera capable of capturing still or motion pictures. Thus, the given camera 21 may refer to any camera device such as those used for still photography, television, motion picture or the like. For example, according to various aspects, the given camera 21 may be a cinema type camera such as an ARRI digital cinema camera, a Sony digital cinema camera, a RED digital cinema camera, and the like. According to other aspects, the given camera 21 may be the camera of a mobile telephone, a cellular telephone and the like. Although only one camera 21 is shown in FIG. 1 and FIG. 2, it will be appreciated the camera system 20 may include any number of cameras 21, and at least one of the cameras 21 may be different from another one of the cameras 21. For example, according to various aspects, the camera system 20 includes a plurality of cameras 21 for the capturing of a scene from multiple concurrent points of view. However, for purposes of simplicity, the one or more cameras 21 will be described hereinafter in the context of a single camera 21.

According to various aspects, the camera 21 may include a lens 22, the image and data collection system 30, the camera control system 40 and a tracking system 50. According to other aspects, the camera 21 does not include one or more of these features. According to various aspects, the camera 21 is configured to record footage that is uncompressed with full-color data or in a high quality, high bit-rate logarithmic (e.g., LOG 10-bit, LOG 12-bit, or a higher bit-depth format) or RAW profile. The camera 21 is also configured to provide outputs (captured images, captured image data, and/or device and/or device configuration data) to the image and data collection system 30. For example, as shown in FIG. 2, the camera 21 may output a captured image via a media transmission interface 35 to the image and data collection system 30, and may also output metadata (e.g., captured image information and device configuration data) via a data transmission interface 34 to the image and data collection system 30. For aspects where the camera 21 is a "motion" camera such as, for example, a digital cinema camera, the captured images and the metadata associated with the captured images are stored on a frame-by-frame basis. For aspects where the camera 21 is a "still" camera, the captured images and the metadata associated with the captured images are stored on a per-image captured basis.

According to various aspects, the camera 21 is further configured to collect footage in a manner that can be output to a color grading device 61 with enhanced grading capability. According to various aspects, the camera 21 is configured to record footage in a logarithmic profile (LOG) and provide a LOG video output to the color grading device 61. For example, in various aspects, the camera 21 may record footage in a logarithmic 12-bit profile and provide a logarithmic 10-bit profile video output to the color grading device 61. Of course, in other aspects, the camera 21 may record footage in a logarithmic profile higher than a logarithmic 12-bit profile and provide a logarithmic profile video output higher than a logarithmic 10-bit profile video output to the color grading device 61. According to other aspects, the camera 21 is configured to record footage in a logarithmic color profile and provide a video output also using LOG to the color grading device 61. According to yet other aspects, the camera 21 is configured to record footage in a high bit width or RAW format and provide a video output to the color grading device 61. The system 10 can process any footage suitable for workflow. Various aspects of the footage, include but are not limited to: resolution (e.g. SD, HD, 4K, 8K, etc.), bit depth (e.g. 8-bit, 10-bit, 12-bit, etc.), quantization (e.g. linear, gamma, PQ, LOG, etc.), colorspace (e.g. rec709, rec2020, etc.) and codec (e.g. H.264, ProRes, etc.). For purposes of simplicity, the camera 21 and the system 10 will be described hereinafter in the context of the camera 21 recording footage in logarithmic 10-bit color profile (LOG 10) bit and providing a LOG 10 video output to the color grading device 61.

According to various aspects, the camera 21 may be utilized as a color sensor. The color and intensity of one or more display devices 100 are observed by the camera 21. The observed color is input into the master control system 90 and is compared against baseline values for the same color. As the display devices 100 are adjusted, the camera 21 can report the measured result back to the master control system 90. The master control system 90 can create an adjustment profile to the color parameters within the system 10 until the image textures being passed through the system 10 appear identical to the expected state of the system 10. The profile may then be stored and applied to all devices within the system 10 in order to achieve an accurate recreation of the intended color.

In general, a texture or an image texture may be considered to be a multi-dimensional matrix of values that make up a digital image. Two dimensions represent the measured size horizontally and vertically of the image. In traditional representation, the horizontal and vertical components of the image are defined as X and Y coordinates. Within image processing, they are also referred to as U and V following the common model of UVW coordinate systems within 2D and 3D systems. Within any system using textures, the X and Y or the U and V representations are measured in pixels where a pixel is a single dot that will have its own discrete color data. A texture utilizes additional values that represent the intensity state of each pixel as different color intensity values. A texture has one or many channels of intensity per pixel commonly referred to as color channels. Each channel of color per pixel is represented as an intensity value. The intensity value of each pixel color channel may be specified as an integer value which is defined by the specified bit depth of the texture. For example, a texture defined with 8-bit color will utilize an 8-bit integer for each color channel giving values between 0 and 255 for the minimum to maximum range. The system 10 stores these integer values for each color channel for each pixel. It will be appreciated a texture can have any number of color channels. According to various aspects, a texture within the system 10 comprises a 3-vector texture which includes red, green, and blue channels. According to other aspects, a texture within the system 10 comprises a 4-vector texture which includes red, green, blue, and alpha channels. However, it will be appreciated a texture within the system 10 may comprise any number of color channels and the system 10 is configured to take into account each of the color channels when performing the intensity measurements for the texture.

As shown in FIG. 2, according to various aspects, the camera control system 40 may include an optical internal control 42 of the camera 21, an optical external control 43 of the camera 21 (e.g., shutters, filters, iris, focus, zoom and servo mechanisms) and a positional and mechanical control 41 of the camera 21. The optical internal control 42 may be part of the camera 21 and is configured to manage the visual and optical parameters of the camera system 20 and the lens 22 of the camera 21. For example, the optical internal control 42 may be configured to filter the incoming light being exposed to the aperture, the aperture size, the aperture timing, and similar characteristics related to the light that is entering the camera 21 through the aperture. The optical external control 43 is configured to control camera lens characteristics such as lens focus, lens focal length, external aperture or iris settings, external filters such as polarization, density mediums, or color correction filters. The positional and mechanical control 41, which can include both hardware and software, is configured to affect the position and rotation of the camera 21 in 3-dimensional (3d) space and can contribute to controlling factors and/or monitor the state of the optical internal control 42 and the optical external control 43. For aspects where the camera system 20 includes a camera 21 such as, for example, a digital cinema camera, the camera control system 40 includes the optical internal control 42, the optical external control 43, and the positional and mechanical control 41. However, for aspects where the camera system 20 includes a camera 21 such as, for example, a mobile telephone, a cellular telephone or the like, the camera system 20 does not necessarily include the camera control system 40, or one or more of the optical internal control 42, the optical external control 43 and the positional and mechanical control 41.

With respect to optical control of the camera 21, it will be appreciated the system 10 measures the physical states of the lens 22, the iris, optics and configurations of the camera systems 20. The system 10 is also aware of the configuration states that exist within the system 10. The virtual and mechanical systems are treated as one system so that a change to one of the systems is measured with relationship to all other systems. When an adjustment of the virtual or mechanical system is performed, the corresponding changes are concurrently and proportionately applied to the other subsystems/components of the system 10. The virtual images will adjust to emulate the effects that the same adjustment would dictate on the physical system.

The tracking system 50 includes one or more of a camera tracker 51 and an object tracker 52, and can be any suitable type of tracking system. For example, the tracking system 50 may be like those made by Intel, Apple, Perception-Neuron, Optitrack, Blacktrax, Mo-Sys, Trackman, Stype and the like. According to other aspects, the tracking system 50 may include tracking mechanisms such as those found on smart devices which utilize depth sensing (e.g., a light detection and ranging scanner of an Apple iPad, a stereo camera of a Samsung Galaxy device, etc.), optical identifications and the like. Such smart devices can include, for example, a smart phone, a tablet, an action camera, a depth camera and the like. The camera tracker 51 and/or the object tracker 52 can be operated as part of or independently of camera system 20.

The camera tracker 51 may be any suitable type of camera tracker. For example, according to various aspects, the camera tracker 51 utilizes an image sensor affixed to the camera 21 (e.g., a witness camera), and the camera 21 is used to observe reference objects or markers within the room or environment. According to other aspects, the camera tracker 51 utilizes static emitters or beacons that are affixed to the camera 21 in known locations so that a network of external sensors can triangulate their locational relationships in 3-d space. According to yet other aspects, the camera tracker 51 utilizes emitters placed throughout the room or environment at fixed, known locations. Those emitters are then observed by sensor clusters attached to the camera 21 or device. As the sensor cluster moves, subtle changes affect the distance being measured between the emitters and sensors to a very minute degree so that exact positional and rotational data can be derived regarding the camera 21. According to yet other aspects, the camera tracker 51 utilizes gyroscopes and/or accelerometers to interpret variations in movement via angular and linear acceleration so that such data can be used to enhance the precision and/or error correction of the concurrent systems. Each of the above-described aspects can be incorporated into the camera tracker 51 and can utilize companion algorithms or technologies to enhance their resolution through the use of precision gyroscopes and the combined data between the various aspects can be utilized to determine a location of the camera 21 in 3-dimensional space. Data associated with the determined location of the camera 21 is output by the tracking system 50 and passed to other systems including the master control system 90 and the image display system 70. Although the camera tracker 51 was described above in the context of tracking and determining the location of a single camera 21, it will be appreciated the camera tracker 51 may be utilized to track and determine the location of any number of cameras 21. According to various aspects, the camera tracker 51 is considered to be a part of the positional and mechanical control 41.

The object tracker 52 functions similar to the above-described camera tracker 51, and may utilize a combination of all the technologies described with reference to the camera tracker 51. However, instead of using those technologies to identify the location of the camera 21, they take in the camera location data and use it as a reference point to determine the location of an object 13 or subject such as, for example, a scene subject 12 who appears within the field of view of the camera 21. Stated differently, the object tracker 52 determines the location of an object 13 or subject 12 in relation to the location of the camera 21. Data associated with the determined location of the object 13 or subject 12 is output by the tracking system 50 to the master control system 90. Although the object tracker 52 was described above in the context of tracking and determining the location of a single object 13 or subject 12, it will be appreciated the object tracker 52 may be utilized to track and determine the location of any number and type of different objects 13 or subjects 12.

The object 12 can be any physical object in and around the scene or location that is being captured. Physical objects include anything identified in measured 3D space that relate to the origin of the scene in both physical and virtual space. The objects will have a measurable distance and orientation to the scene. Their relationship in physical space is used by the system 10 to identify and register a coordinate system. Basically, scanning the environment with either the camera 21, the camera tracker 51, or the object tracker 52 from the system 10 or with any other system that can be used to scan the environment such as an optical, radar, sonar, or the like system, the system 10 is able to be aware of the full 3d relationship of the inside and surroundings of a scene so that this relationship can establish a 3d coordinate system that the system 10 can use to determine relationships between the virtual and physical scene.

For aspects where the camera system 20 will target a portion of a single display device 100, a portion of multiple display devices 100 or the entire array of the display devices 100, the camera tracker 51 and the object tracker 52 can cooperate to establish a 3-dimensional relationship of the scene and all objects 13 or subjects 12 present within the scene so that the physical parameters of the camera 21 and virtual aspects of the visual content can be affected together in a manner that simulates reality whether literally or in a stylized form. The influence of the camera control system 40 is configured to affect both the real and the virtual optical characteristics of the scene and physical optical elements of the camera 21. The camera control system 40 is utilized to adjust the perceived focus of projected images displayed on the display devices 100 as needed to realize the desired effect. For aspects where the camera system 20 includes a camera 21 such as, for example, a digital cinema camera, the camera tracker 51 and the object tracker 52 may be positioned external to the camera 21 and may cooperate to determine the location of anything within the scene such as, for example, one or more physical objects 13, one or more subjects 12 or persons, movement and/or one or more cameras 21. For aspects where the camera system 20 includes a smart device such as a smartphone, a tablet, and the like which include a camera 21, the smart device may utilize its own internal systems to realize the functionality provided by the tracking system 50, the camera tracker 51 and/or the object tracker 52.

It will be appreciated the system 10 may be considered to utilize parametric tracking. The system 10 utilizes one or more camera trackers 51 to determine the location of each camera 21 in 3D space. The cameras 21 are also connected to one or more object trackers 52 which observe the scene. As the camera 21 is focused tighter on an object 13 within the scene, the object trackers 52 will have an enhanced level of detail relating to the precision of the object tracking method. When the data from the camera trackers 51 is combined with the data from the object trackers 52, levels of precision and error correction can be increased. With respect to display and subject tracking, it will be appreciated the combination of the tracking system data and a known 3D state of the physical and virtual world tells the system 10 precisely where the display devices 100 and other objects 13 or subjects 12 exist within a scene. Knowledge of the combined virtual and real elements can be fed into the master control system 90 in order to affect color, intensity, or focus of elements, textures, and configurations of the scene.

The image and data collection system 30 is communicably coupled to the camera system 20, the master control system 90 and the review system 80, and is configured to store images captured by the camera 21 and metadata associated with the images captured by the camera 21. For aspects where the camera 21 is a "motion" camera such as, for example, a digital cinema camera, the captured images and the metadata associated with the captured images are stored on a frame-by-frame basis. For aspects where the camera 21 is a "still" camera, the captured images and the metadata associated with the captured images are stored on a per-image captured basis. According to various aspects, the image and data collection system 30 includes a data transmission interface 34, a media transmission interface 35, a captured image storage container 32, a captured metadata storage container 33, and a captured image transcoder 31. According to other aspects, the image and data collection system 30 does not include the captured image transcoder 31.

The media transmission interface 35 is communicably coupled to an output of the camera 21 (e.g., which may be a video signal output or an internetworking-based digital signal such as Ethernet) and can be any suitable media transmission device. For example, according to various aspects, the media transmission interface 35 may be a flash drive or a solid-state drive coupled to the camera system 20 and configured to store images captured by the camera 21 on a frame-by-frame basis or a per image captured basis.

According to other aspects, the images captured by the camera 21 may be stored by a storage medium within the camera 21, and the storage medium may be subsequently removed from the camera 21 and connected or coupled to the media transmission interface 35. According to various aspects, the media transmission interface 35 may form a part of the camera 21. The data transmission interface 34 is communicably coupled to an output of the camera 21 and may be any suitable metadata transmission device. For example, according to various aspects, the data transmission interface 34 may be a flash drive or a solid-state drive coupled to the camera system 20 and configured to store metadata associated with an image or images captured by the camera 21 on a frame-by-frame basis or a per captured image basis. According to other aspects, the metadata may be stored by a storage medium within the camera 21, and the storage medium may be subsequently removed from the camera 21 and connected or coupled to the data transmission interface 34. According to various aspects, the data transmission interface 34 may form a part of the camera 21.

The captured image storage container 32 is communicably coupled to the media transmission interface 35 and is configured to store captured images on a frame-by-frame basis or a per captured image basis. The captured metadata storage container 33 is communicably coupled to the data transmission interface 34 and is configured to store metadata associated with an image or images captured by the camera 21 on a frame-by-frame basis or a per captured image basis. Although only one captured image storage container 32 and one captured metadata storage container 33 are shown in FIG. 1, it will be appreciated the image and data collection system 30 may include any number of captured image storage containers 32 and captured metadata storage containers 33. Also, although the captured image storage container 32 and the captured metadata storage container 33 are shown in FIG. 1 as two separate storage devices, it will be appreciated the captured image storage container 32 and the captured metadata storage container 33 may be combined into a single storage device of image and data collection system 30. According to various aspects, the image and data collection system 30 may be further configured to merge the stored captured images with the associated stored metadata. Once the captured images and the metadata associated with the captured images are stored in a digital file format on a frame-by-frame basis, the captured images and the metadata associated with the captured images may be utilized in various post-production processes while permitting the full range of enhancements to the footage captured by all aspects of the camera system 20.

The captured image transcoder 31 is communicably coupled to the captured image storage container 32 and is configured to convert or regenerate the video files stored on the captured image storage container 32. For example, in various aspects, the captured image transcoder 31 may convert the video files from one encoding format to another encoding format and/or from one resolution to another resolution as needed so that the image files can be transmitted and displayed on various devices. According to various aspects, the captured image transcoder 31 may pass the video files through multiple systems either indicated within these figures or otherwise and measured in any capacity by the master control system 90 for the purpose of applying and executing computer vision algorithms in such a manner to render a lower resolution source image into a much higher resolution generated image via computer enhancement. According to various aspects, the components of the image and data collection system 30 may provide functionality like equipment or software made by Avid, Apple, Adobe, EVS, Blackmagic, AJA, and the like. According to various aspects, the captured image transcoder 31 can be directly communicatively coupled to the camera 21 and/or to other devices within the camera system 20.

The display devices 100 are communicably coupled to the image display system 70 and are configured to display various images (e.g., video, a static picture, etc.) thereon. It will be appreciated that the various images displayed on the display devices 100 can be captured by the camera system 20 during the capture of a scene. The display devices 100 can be any suitable type of display device which produces or emits light or color. For example, according to various aspects, the display devices 100 can be a light-producing device such as, for example, a light emitting diode (LED) display 101, a video projector 102, a liquid crystal display (LCD) 103, a spot lighting device 104, an ambient lighting device 105, and the like. According to other aspects, the display devices 100 can be a pixel-based display device such as, for example, a light-emitting diode (LED) display like those made by ROE, Sony and the like, or lighting fixtures or devices like those made by Martin, Robe or the like. For such aspects, the display devices 100 may include a plurality of pixels coming from multiple devices. Although several display devices 100 are shown in FIG. 1, it will be appreciated the system 10 may include any number of display devices 100. For example, according to various aspects, the display devices 100 can include a plurality of individual display devices 100 which cooperate to form a larger display system. Such display devices 100 can be configured to take on any shape or orientation. For example, a configuration of the display devices 100 can be multi-dimensional such as full cubicle (with or without an overhead ceiling and/or a sub-level floor display component), multiple flat displays or walls, a curved screen, a flat screen and combinations thereof. The type of display devices 100 utilized for one application can be different from the type of display devices 100 utilized for another application based on the needs of the respective applications. For purposes of simplicity, the display devices 100 will be described hereinafter in the context of a single display device 100.

The images displayed on the display devices 100 may be associated with images pre-recorded by a camera in a setting that can be either the same location (e.g., on-set) or a different location (e.g. off-set) than where the associated scene is being captured. The images recorded by the camera can be, for example, any real or imaginary scene or environment that is generated or reproduced etc. For example, the images recorded by the camera offset can be, for example, images of a city, images of a rural area, an image of a given object, etc. After the images are captured by the camera, the images may be edited by a post-production facility, and possibly a visual effects (VFX) house, before becoming a finished file stored by the image display system 70 for subsequent delivery to and display by the display devices 100. In addition, the visual content being delivered to the display devices 100 may be associated with images created in a digital 2-dimensional or 3-dimensional environment by a post-production facility or visual effects (VFX) house. According to various aspects, the digital 3-dimensional environment can be generated live by software/algorithms at the image display system 70.

In certain aspects, the display devices 100 may also be utilized as a solid color background so a visual effects team can subsequently perform a difference key operation (e.g., chroma-keying, luminance keying). In a difference key operation, a distinct separate background color is displayed on one or more of the display devices 100. Visual processing of the distinct separate background color can treat the color as an area that will become transparent in further image processing, allowing the visual effects team the ability to place different backgrounds in its place. For example, when shooting for a given scene, the display devices 100 may display a first previously recorded image for the first frame of the shoot. When shooting a second frame, the display devices 100 may be configured as a solid color background. When shooting a third frame, the display devices 100 may display the first previously recorded image or a second previously recorded image. When shooting a fourth frame, the display devices 100 may once again be configured as a solid color background. This process may be repeated for any number of subsequent frames.

The image display system 70 includes an image delivery system 73 and a display controller 74, is communicably coupled to the master control system 90 and the display devices 100, and is configured to receive imagery from either an image decoder 71, an image generator 72, or both concurrently. The imagery transmitted from the image decoder 71 and/or the image generator 72 is passed as controllable sources into the image delivery system 73.

The image decoder 71 is a repository for the components that make up the source images that will be displayed on the display devices 100. The image decoder 71 is configured to extract the source image components and combine or compose them into a larger image that is communicated to the image delivery system 73 as a stream that will be mapped to the display controller 74 and ultimately displayed by the display devices 100. Although only one image decoder 71 is shown in FIG. 2, it will be appreciated the image display system 70 may include any number of image decoders 71.

The image generator 72 is configured like the image decoder 71. The image generator 72 is configured to compose components into a single image stream that is communicated to the image delivery system 73. The image generator 72 includes a series of generative engines which create realistic virtual environments that relate to the scene based on the perspective of the camera system 20 as specified by the relationship of the location of the camera 21 relative to the scene in both real and virtual space. The stream delivered to the image delivery system 73 by the image decoder 71 and/or the image generator 72 are a series of composite canvases that are comprised of multiple layers and multiple pieces of the images that comprise the look of a scene. Although only one image generator 72 is shown in FIG. 2, it will be appreciated the image display system 70 may include any number of image generators 72.

Figure 9:
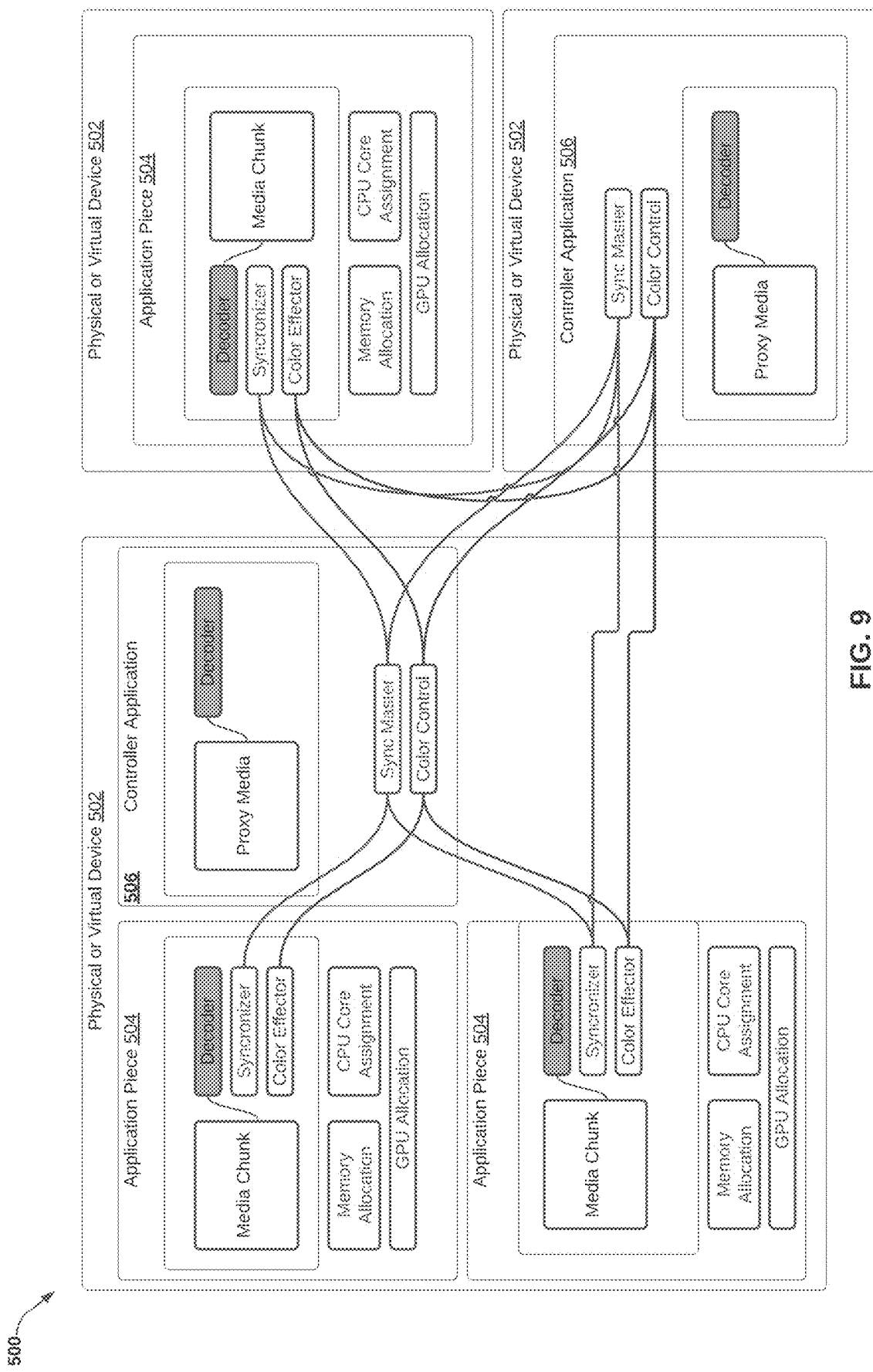
FIG. 9 illustrates multiple variations of a computing system utilized as an image decoder, an image generator system and/or an image delivery system of the system of FIG. 1, in accordance with at least one aspect of the present disclosure.

According to various aspects, the image delivery system 73 is used to process the imagery received from the image decoder 71 and/or the image generator 72 so that such images can be displayed on any configuration of display devices 100 based upon the position, state, and configuration of the camera system 20. For example, according to various aspects, the position and pixel densities of the display devices 100 are initially defined in a 3-dimensional representation of the scene that takes into account the correlation between virtual 3-dimensional space and real-world 3-dimensional space concurrently. Within the defined 3-dimensionally represented space of the scene, the imagery being passed to the image delivery system 73 is projected onto the 3-dimensional representation of the display devices 100 from the point of view of the camera system 20 utilizing the active characteristics of the camera 21 in order to determine an accurate representation of the frustum of the camera 21. Once the image source being passed to the image delivery system 73 is affected to match the camera system 20 by aligning it with the position, rotation, optical, visual and intensity characteristics of the camera system 20, the imagery being projected into the image delivery system 73 is the exact image that is the frustum of the camera 21 onto the display devices 100. According to various aspects, the image delivery system 73 may be configured to process the received imagery for subsequent display on devices for retail applications, exhibition applications and the like. The image delivery system 73 may be similar to or include functionalities of equipment made by Pixotope, Disguise and the like. An example of a computer system 500 which may be utilized to implement the image decoder 71, the image generator 72 and/or the image delivery system 73 is shown in FIG. 9.

The display controller 74 is communicably coupled to the image delivery system 73 and the display devices 100, and is configured to drive, power and/or control components of the display devices 100 in order to have the imagery output by the image delivery system 73 be displayed on the display devices 100. The display controller 74 may be any suitable type of controller. For example, according to various aspects, the display controller 74 may be suitable for driving or powering individual pixels of a LED display of the display devices 100 in various formats or resolutions that may be standard or may be other than standard (e.g., other than HD, UHD, 4K, 8K, etc.). The display controller 74 may be similar to or include functionalities of equipment made by Barco, Christie, Panasonic, Brompton Technology, Megapixel VR and the like. Although only one display controller 74 is shown in FIG. 2, it will be appreciated the image delivery system 73 may include any number of display controllers 74.

The review system 80 is communicably coupled to the image and data collection system 30, is configured to allow any personnel, whether on-set or off-set, to view and affect the images captured by the camera 21 in different formats, and includes a grading review device 81 and one or more monitoring devices 82. According to various aspects, the review system 80 is further configured to allow for images displayed on the display devices 100 to be affected prior to the capture of the images by the camera 21. According to various aspects, the grading review device 81 is configured to display the image as captured by the camera 21. This allows for the on-set personnel to determine whether changes introduced by the color grading device 61, other devices (e.g., lighting controls, etc.) or the master control system 90 have produced the desired visual enhancement of the scene.

Although only one monitoring device 82 is shown in FIG. 2 for purposes of simplicity, it will be appreciated the review system 80 may include any number of monitoring devices 82. According to various aspects, the monitoring devices 82 are configured to display the image captured by the camera 21 in various formats to allow on-set personnel to determine how the image captured by the camera 21 will look when viewed in different formats. For example, for instances where the image is captured by the camera 21 and output to the image and data collection system 30 in a 10-bit LOG format or in a 12-bit LOG format, the captured image transcoder 31 of the image data and collection system 30 may transcode the captured image to a first format, high dynamic range (HDR), required for a first one of the monitoring devices 82, and the first one of the monitoring devices 82 may then display the image captured by the camera 21 in the HDR format for viewing by the on-set personnel. Similarly, the captured image transcoder 31 of the image data and collection system 30 may transcode the captured image to a second format, full high definition (HD), required for a second one of the monitoring devices 82, and the second one of the monitoring devices 82 may then display the image captured by the camera 21 in the HD format for viewing by the on-set personnel. The one or more monitoring devices 82 may also include, for example, an ultra-high-definition (UHD) monitoring device, a standard dynamic range (SDR) monitoring device, a 4K monitoring device, an 8K monitoring device, and/or monitoring devices other than those described above. For each of these different monitoring devices 82, the captured image transcoder 31 of the image data and collection system 30 may transcode the captured image to the format appropriate for the monitoring device 82 to display the image captured by the camera 21 in the appropriate format for viewing by the on-set personnel. The above-described monitoring devices 82 is like those made by Sony, Flanders Scientific, Ezio, and the like.

The one or more control devices 60 are communicably coupled to the image and data collection system 30 and the master control system 90, are configured to affect the images captured by the camera 21, and include the grading device 61, a lighting control device 62 and a control interface 63. According to various aspects, the control devices 60 may be considered a part of the master control system 90.

The grading device 61 is configured to allow on-set colorists or other personnel to enhance the appearance of the image displayed on the display devices 100 and subsequently the appearance of the image captured by the camera 21. According to various aspects, the grading device 61 is configured to receive the RAW or logarithmic video output of the camera system 20, and grade the color associated with the LOG 10-bit video output of the camera system 20 on a frame-by-frame basis. The grading device 61 is configured to grade the color by adjusting any of the following associated with the "colors" on the display devices 100 and/or the frames captured by the camera system 20: hue, saturation, brightness/luminance, contrast, color temperature, black level, gamma, etc. The grading device 61 may be implemented by any suitable color grading system or desk. Although the above-described grading device 61 was described in the context of RAW or logarithmic recordings, it will be appreciated that the grading device 61 may also be configured for use with recordings applicable to exponential curves, linear curves and technology other than logarithmic. The grading device 61 may be similar to or include functionalities of equipment made by Magic Bullet Suite, DaVinci Resolve, Lightworks, Color Finale, and the like.

The lighting control device 62 is communicably coupled to the master control system 90, and is configured to control the physical lighting on the set, virtual lighting within any generated imagery being passed to the display devices 100 via the image display system 70, as well as the intensity and/or color characteristics of the display devices 100, or any other device within the system 10 being used to affect the scene being captured by the Camera System 20. The lighting control device 62 may be implemented by any suitable lighting control device. For example, according to various aspects, the lighting control device 62 may be a lighting control device similar to those made by Electronic Theater Control (ETC), MA Lighting, Barco, Avolites and the like which utilize serial communication protocols such as DMX, ArtNet, CAN or the like to control lighting systems. According to other aspects, the lighting control device 62 may be used to control any or all devices with the system 10, either directly or specifically through the master control system 90 as an interface of the control devices 60.

For example, the lighting control device 62 may be any lighting controller or device which has the capability to affect any device within the system 10 or external to the system 10 that is capable of remote serial control. According to various aspects, the lighting control device 62 is also configured to indirectly control light sources and/or portions of the display devices 100 which are outside of the frustum of the camera 21. The light sources outside of the frustum of the camera 21 can be thought of as another on-set source of light.

The control interface 63 is communicably coupled to the master control system 90, and is configured to provide for primary color controls, secondary color controls, curve controls and look management. With respect to the primary color controls, the control interface 63 allows for adjustments and changes to be made to the entire image canvas. Such adjustments can include, for example, (i) global controls, (ii) lift/shadow controls, (iii) gamma/midtone controls, and (iv) gain/highlights controls. The global controls change the image as a whole, such as luminance, saturation, hue and overall color temperature. According to various aspects, the primary color controls utilize a three-band system. For example, the lift/shadow controls describe the darkest part of any image canvas, from 0%-33% luminance, and allow a colorist to change luminance and hue for this luminance range. The gamma/midtones controls describe the middle part of the image canvas, from 33%-66% luminance, and allow a colorist to change luminance and hue for this luminance range. The gain/highlights controls describe the brightest part of the image canvas, from 66%-100% luminance, and allow a colorist to change luminance and hue for this luminance range. It will be appreciated the above-described luminance ranges are not isolated from each other. There is a soft overlapping fall off allowing adjustments in the lift/gamma/gain to alter luminance directly in their proscribed luminance range of the image canvas but also in a decreasing manner for the rest of the image canvas. According to other aspects, the primary color controls utilize a system other than a three-band system. For example, the primary color controls may utilize a six-band system or some other system which provides a user with greater control across the image canvas than that which is provided by a three-band system.

With respect to the secondary color controls, the control interface 63 and the grading device 61 are configured to allow for adjustments and changes to be made to only a selected portion of image canvas. Such adjustments can include, for example, (i) power window/vignette controls and (ii) hue, luminance and saturation qualifier controls. The power window/vignette controls allow a colorist to draw, using predefined shapes or a bezier curve drawing tool, areas that will isolate the primary color controls. The power window/vignetted shape can be manipulated in size, aspect, rotation and position and have a control for the edge softness, allowing changes to blend into the entire image canvas. According to various aspects, all of the primary adjustments available in the primary controls are available to the power windowed/vignetted area but only affect either inside or outside the windowed/vignetted area which may be selected by an inside/outside toggle by the colorist. The hue, luminance, and saturation qualifier controls allow for selections of part of the image to be made based on HSL (hue, saturation, and luminance), and allow for a portion of the image (e.g., all bright and saturated red portions) to be isolated and then adjustments made to just this portion of the image canvas. According to various aspects, the control interface 63 and the grading device 61 are configured to allow for adjustments and changes other than the above-described hue, luminance, and saturation qualifier controls. For example, the control interface 63 and the grading device 61 may be configured to allow for adjustments and changes based on qualifier controls for various color spaces (e.g., tristimulus, CIE XYZ, etc.) or color models (e.g., RYB, RGB, CMY, CMYK, HSV, etc.).

With respect to the curve controls, according to various aspects, the control interface 63 is configured to allow for a quick adjustment to the image canvas in three different ways—via (i) a luminance curve, (ii) a hue vs. saturation curve or (iii) a hue vs. hue curve. The Luminance curve allows for quick adjustments to the contrast of an image. Adding points on a luminance graph allows for the creation of a curved luminance versus a linear 0 to 1 luminance. The hue vs saturation curve allows for quick adjustments to the saturation of part of the image canvas based on a selected hue range. Adding points on a hue graph allows for isolation of that hue and adjusting positively or negatively results in the alteration of the saturation of the selected hue range over the entire image. The hue vs hue curve allows for quick adjustments to the hue of part of the image canvas based on a selected hue range. Adding points on a hue graph allows for isolation of that hue and adjusting positively or negatively results in the alteration of the hue of the selected hue range over the entire image. For example, selecting the primary red color on the curve allows positive adjustments to push the reds towards pink and magenta and then blue and a negative adjustment will push the reds towards yellow then green then blue. According to various aspects, the control interface 63 is configured to allow for a quick adjustment to the image canvas in ways other than via (i) a luminance curve, (ii) a hue vs. saturation curve and/or (iii) a hue vs. hue curve.

With respect to the look management, the control interface 63 allows for (i) saving, (ii) importing/exporting and (iii) applying saved/imported looks to the image canvas. For the saving looks, when a colorist has created a look and wishes to work on a new scene, the control interface 63 allows for the set of adjustments that have been applied to be stored/saved by the system 10 before moving to a new scene. All primary, secondary and curve adjustments will be stored along with captured reference still image of the scene. For the exporting/importing looks, all adjustments made in a scene saved in a look can be exported as metadata plus the reference still. This exported metadata and reference still can be imported into any other system and the scenes look can then be applied, appended or referenced by a colorist. For the applying look, saved, or imported looks can be applied to a scene allowing for all stored adjustments to be applied or appended to a scene. These applied or appended adjustments can then be considered live and can be fully altered in the current scene. These alterations do not change the saved/imported look.

The master control system 90 is communicably coupled with the camera system 20 (including the camera control system 40 and the tracking system 50), with the image and data collection system 30, with the image display system 70, and with the control devices 60 (including the grading device 61, the lighting control device 62 and the control interface 63). According to various aspects, the master control system 90 is configured to control/adjust parameters of the camera 21, control/adjust parameters associated with content output by the image decoder 71 and/or the image generator 72, and control/adjust parameters of the display controller 74 and/or the display devices 100. The master control system 90 is also configured to analyze data associated with each of these adjustments, determine which of these adjustments results in the least destruction to the image to be captured by the camera 21, apply the adjustments which result in the least destruction to the image to be captured by the camera 21, and save the settings of various components of the system 10 as metadata on a frame-by-frame basis. Additional information regarding the concept of destruction and/or destructive are described hereinbelow.

With respect to the camera system 20, according to various aspects, the individual frames which are captured from the camera system 20 via the media transmission interface 35, as well as the metadata captured by that camera system 20 via the data transmission interface 34, are referenced within the master control system 90 via an index system. According to various aspects, the index system is an index numbering format which is assigned to each frame during data capture. This frame index can be a numerical identifier associated with each frame, and can be linked back to other indexing systems, such as timecode. The index system is a representation of a relationship between the frame images, and any data or settings that are affected during the capture of a scene. The indexes are linked to metadata settings, and the metadata with regard to the indexing system refers to state and operational changes from the presets, triggers and sequences of the control devices 60, as well as other data from other parts of the system 10. Due to the indexing system, offsets can be established, utilizing multiples of a frame count in order to create completely different and unique visual characteristics for each camera 21 being used to capture the imagery displayed on the display devices 100. For example, index one may correspond to frame one in one camera. Index two may correspond to frame one in a second camera and index three may correspond to frame one in a third camera, etc.

In view of the above, it will be appreciated the system 10 is capable of indexing of capture and operating process of the system 10. The traditional method of identifying video states over time is to iterate each successive frame of video. These frame numbers become the basis of timing throughout a production system. In contrast, the system 10 assigns a unique index number to all states, settings, configuration, and collected media elements. According to various aspects, the index number is related to the specific point in time that the event occurred tracked with precision time, is a collected string of characters that remains completely unique, is comprised of sections of characters, and each section corresponds to a table of predefined definitions that describe what the item being indexed is, what settings were applied to it, and at what time it was captured. The index can serve as a pointer to records of the event. The records store the settings of each subsystem/component of the system 10 based on logical conventions of organization. Records that utilize the index can contain simple or complex data related to the configuration of any device or setting within the system 10. Records may also retain detailed information relating to how each image was captured.

According to various aspects, the master control system 90 is also configured to link data from the camera control system 40 and the tracking system 50 to create a repeatable scene where physical, and virtual characteristics of that scene can be reviewed or adjusted through repeatability.

In addition to the factors/parameters that are controlled by the camera system 20, the master control system 90 is also configured to operate and integrate into third party image and data control systems through protocol standardizations. The master control system 90 is able to provide standards by which such image and data control systems can connect between different devices, review systems and camera systems.

With respect to the image and data collection system 30, the communicable coupling of the master control system 90 with the image and data collection system 30 is a digital connection which passes serial data back and forth, and allows for the managing of the data associated with the image and data collection system 30, whether it be to affect the data or react to the data. The communicable coupling of the master control system 90 with the image and data collection system 30 also allows for the control devices 60 to affect the image and data collection system 30. According to various aspects, the master control system 90 is also configured to evaluate and audit states of the image and data collection system 30 which can be tracked in a record keeping system within the master control system 90.

The master control system 90, according to various aspects, is further configured to affect the image and data collection system 30 to perform offsets, variations, presets and automation. The master control system 90 controls the index and it controls the offsets of that index with regard to each captured image. It also controls the image processing. The image processing is related to the image display system 70 and is related to the image decoder 71 and the image generator 72.

With respect to the image display system 70, the indexing system provided by the master control system 90 links to the image display system 70 in order to establish a timing precedent, so that all images delivered by the image delivery system 73 are delivered to the display controller 74 in such a manner where those images will arrive on the display devices 100 in a logical, controlled, and predictable order with regard to exact frame timing, color grading, and any pertinent offsets require to compose the scene.

By being able to utilize the indexes and track the indexes, the image delivery system 73 has the capability to perform proper offsets and establish a link and association between the offsets. The camera 21 that is capturing images can tie into a multi-camera system, and a multi-camera workflow where different physical locations of cameras 21 can simultaneously collect different perspectives of the captured scene or environment since each can be generated separately and concurrently on different parts of the image generator 72. According to various aspects, multiple discrete image decoders 71 and image generators 72 can cooperate to apply imagery to the image delivery system 73, and by extension to the display devices 100, for capture by the camera 21 or by multiple cameras 21. It will be appreciated that a first image generator 72 and/or a first image decoder 71 can be associated with a first camera 21 and the 3-dimensional location and other settings of the first camera 21, a second image generator 72 and/or a second image decoder 71 can be associated with a second camera 21 and the 3-dimensional location and other settings of the second camera 21, etc. The master control system 90 is also configured to manage/control the image decoder 71 and the image generator 72.

As described hereinabove, the master control system 90 is configured to link data from the camera control system 40 and the tracking system 50 to create a repeatable scene where physical, and virtual characteristics of that scene can be reviewed or adjusted through repeatability. The master control system 90 is also configured to provide the states of the camera 21 and objects or subjects 12 within the scene to the image generator 72, and in other cases to the image decoder 71 based on information associated with the tracking system 50.

As disclosed hereinabove, the control devices 60 may form a part of the master control system 90, and the control devices 60 provide for a variety of user interfaces into the system 10 via the master control system 90. The control interface 63 may be considered a native control interface and the grading device 61 and/or the lighting control device 70 also have the capability to interconnect to multiple additional third-party control interfaces. The master control system 90 has the ability to interface directly to the control devices 60, and indirectly with the other elements controlled by the master control system 90 or the lighting control device 62.

Figure 3:
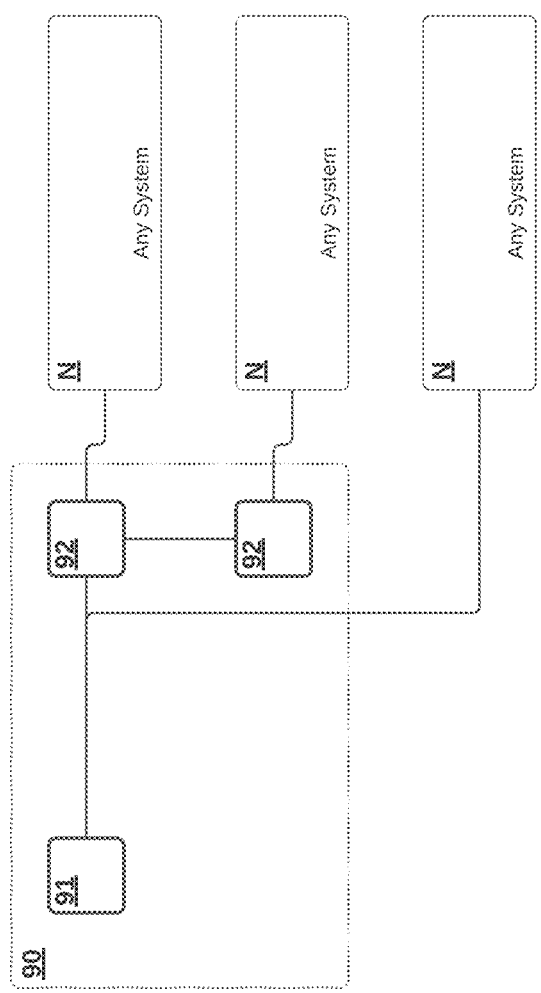
FIG. 3 illustrates a master control system of the system of FIG. 1, in accordance with least one aspect of the present disclosure.

FIG. 3 illustrates the master control system 90, in accordance with at least one aspect of the present disclosure. For such aspects, the master control system 90 includes one or more command nodes 91 and one or more control nodes 92. A given command node 91 may be communicably coupled to one or more of the command nodes 91, to one or more of the control nodes 92 and/or to one or more of the subsystems of the system 10. For purposes of convenience, the subsystems are identified by the letter "N" in FIG. 3. A given control node 92 may be communicably coupled to one or more of the command nodes 91, to one or more of the control nodes 92 and/or to one or more of the subsystems/components of the system 10. Although only one command node 91 is shown in FIG. 3, it will be appreciated the master control system 90 may include any number of command nodes 91. Similarly, although only two control nodes 92 are shown in FIG. 3, it will be appreciated the master control system 90 may include any number of control nodes 92.

Figure 4:
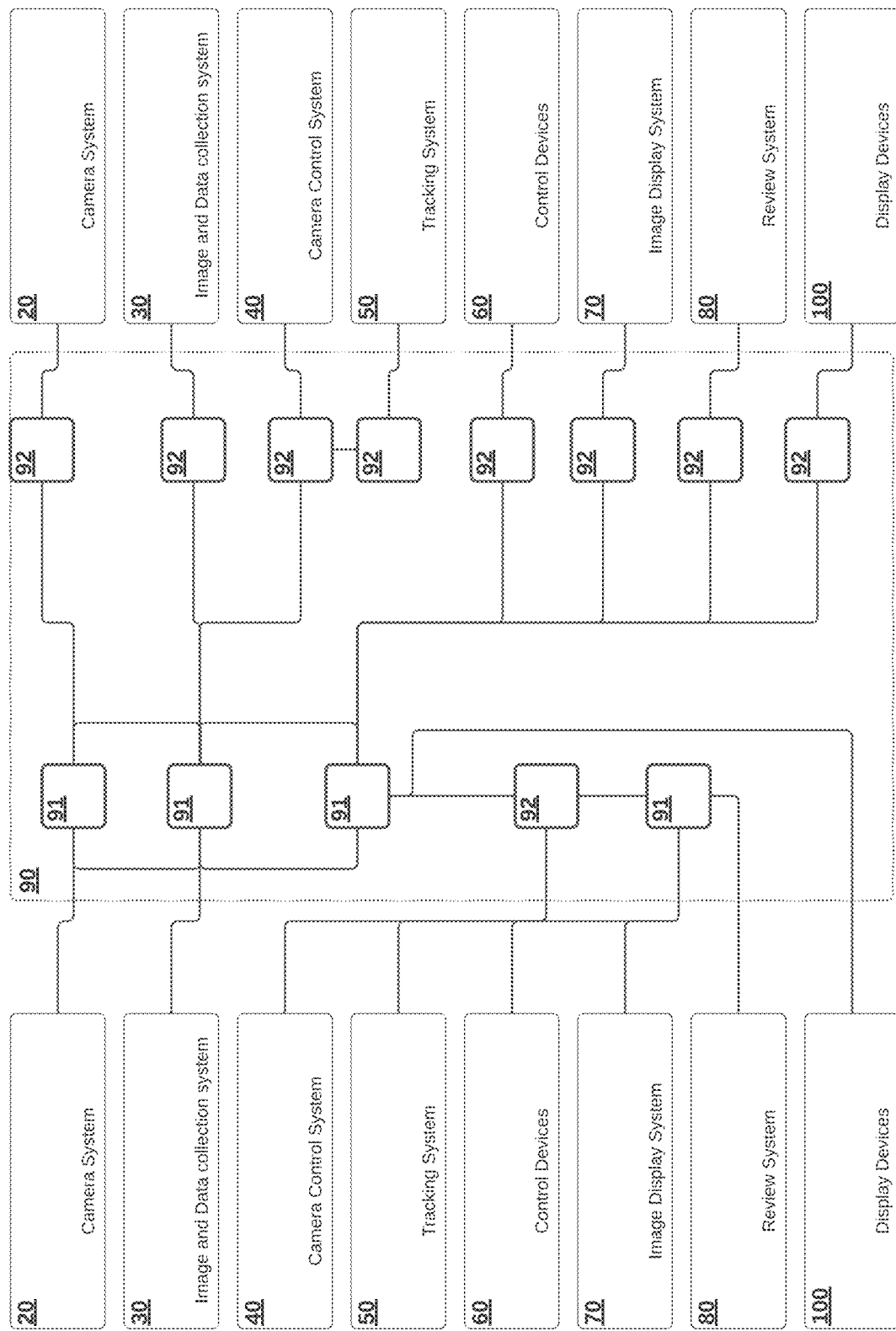
FIG. 4 illustrates a master control system of the system of FIG. 1, in accordance with at least one other aspect of the present disclosure.

FIG. 4 illustrates the master control system 90, in accordance with at least one other aspect of the present disclosure. For such aspects, the master control system 90 includes a plurality of command nodes 91 and a plurality of control nodes 92. As shown in FIG. 4, the command nodes 91 and the control nodes are communicably coupled to a plurality of the subsystems/components (e.g., camera system 20, image and data collection system 30, camera control system 40, tracking system 50, control devices 60, image display system 70, review system 80 and display devices 100) of the system 10. In general, the master control system 90 is utilized to interconnect a plurality of the subsystems/components of the system 10 to provide for visual enhance of a scene. It will be appreciated the master control system 90 may be configured in any number of ways in addition to those shown in FIG. 3 and FIG. 4.

According to various aspects, the operational functionality of the master control system 90 is multi-master. As used herein, multi-master refers to more than a single node having the capability of monitoring, auditing, affecting, or controlling the system 10 either in global responsibility or via discrete device redundancy. Using failover algorithms, the states and status of one command node 91 are passed in unison to other command nodes 91 in a self-healing network, so that if one node was to fail, its roles and responsibilities would be passed to its peers. Stated differently, the command nodes 91 are configured to provide the ability for the system 10 to have a redundant self-healing functionality where one or more command nodes 91 will replicate their functionality to one or more other command nodes 91 of the master control system 90 so that any failure of a given command node 91 will not adversely affect the master control system 90. The command nodes 91 and the control nodes 92 can be unique devices or services running on other devices or modules within the system 10, and can be utilized interchangeably.

According to various aspects, the control nodes 92 may also be configured to be self-healing. According to various aspects, one control node 92 may act as a director over all other control nodes 92 via a control application and associated hardware and concurrently a backup/understudy application running on its own hardware will perform the redundancy taking on the role of the director if the system 10 reports a loss of connection or operation by the director node. Should the director fail, different control nodes 92 within the master control system 90 can perform the same functionality even though each different control node 92 might operate with functionality that would have otherwise been unique for each control node 92.

For example, one command node 91 or control node 92 might connect directly to the camera 21, and thereby be able to monitor and extrapolate the information passing through the data transmission interface 34 and the media transmission interface 35. Another command node 91 or control node 92 may connect to an external third-party imaging data collection system to monitor the acquired metadata and captured images. That same node also has the capability to perform algorithms to adjust the captured image transcoder 31 so that the review system 80 can review the collected images in multiple different formats. A different command node 91 or control node 92 of the master control system 90 may be connected to the display devices 100 in order to monitor and audit the synchronization between those devices, as well as their individual settings and operating states. A display controller 74 which affects the brightness and color characteristics of given display devices 100 can be connected to a command node 91 or a control node 92 of the master control system 90, so that the command node 91 or the control node 92 can monitor those settings and affect them.

A separate command node 91 or control node 92 may also connect to the image display system 70 in such a manner that it can monitor and affect the unique characteristics of the image decoder 71, the image generator 72, the image delivery system 73, and the display controller 74. Additional command nodes 91 or control nodes 92 may be connected to control devices 60, including the lighting control device 62. For example, according to various aspects, the master control system 90 includes dedicated control nodes 92 which provide an interface to perform the color and image manipulation operations on the grading device 61. Concurrently, other command nodes 91 or control nodes 92 are able to connect directly to the lighting control device 62, and/or any other sort of external control device 60, such as those that perform MIDI OSC or other generalized serial control applications.

The master control system 90 may also connect through a command node 91 or a control node 92 directly to the tracking system 50, and can utilize data from multiple different styles of trackers (e.g., camera trackers 51, object trackers 52, etc.) in order to compile that data together and create a correlation.

Figure 10:
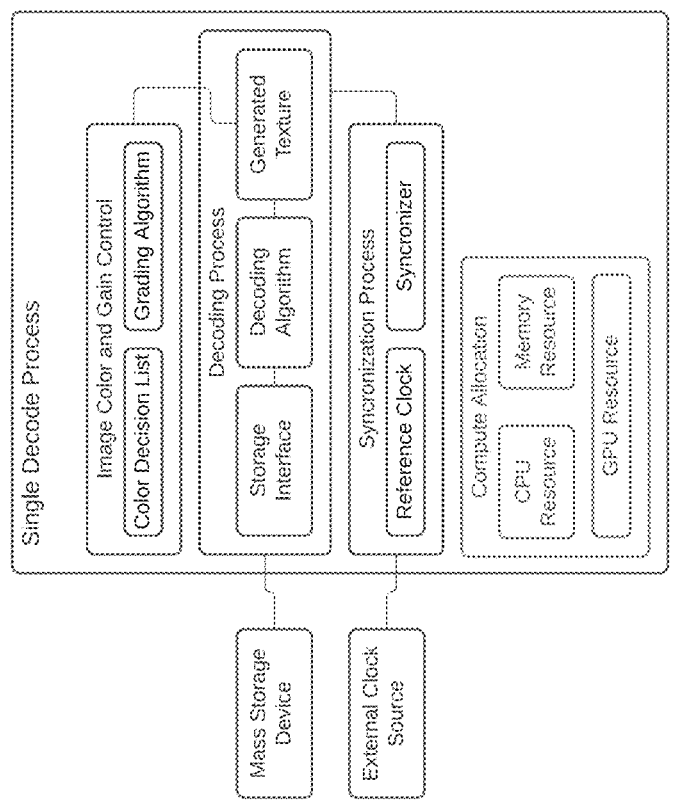
FIG. 10 illustrates device synchronization characteristics of the system of FIG. 1, in accordance with at least one aspect of the present disclosure.

For instances where the camera 21 is a camera such as a digital cinema camera, the master control system 90 is also configured to utilize the rigid connection between the camera 21 and the object tracker 52 to establish a foundation relationship of position and orientation of objects 13 or subjects 12 within the scene by combining the data gathered from both the camera tracker 51 and the object tracker 52. Based on that relationship, the master control system 90 is able to report to the rest of the system 10 the relationships of all objects 13 or subjects 12 (including scene subject 12) within the scene. Observations of those objects 13 or subjects 12 and display devices 100 provide the mechanism by which all functions of the camera control systems 40 interact within the scene as they affect the imagery being generated within the image display system 70. Synchronization characteristics between the various subsystems/components of the system 10 are shown in FIG. 10.

Figure 5:
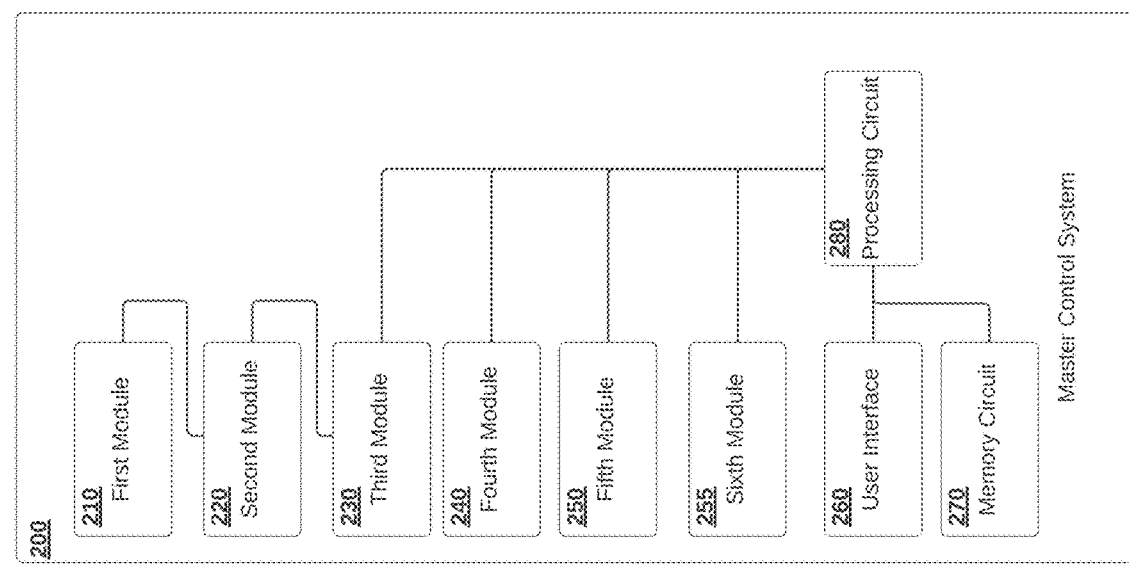
FIG. 5 illustrates a master control system of the system of FIG. 1, in accordance with at least one other aspect of the present disclosure.

FIG. 5 illustrates the master control system 90, in accordance with at least one other aspect of the present disclosure. As shown in FIG. 5, the master control system 90 includes a computing system 200 which includes a processing circuit 280, a memory circuit 270 electrically coupled to the processing circuit 280, a user interface 260 electrically coupled to the processing circuit 280, and one or more modules/algorithms (e.g., modules 210-255) which are utilized to provide the various functionalities of the master control system 90. The computing system 200 may include one or more computing devices which can be any type of computing device such as, for example, a server, a desktop, a laptop, etc. that includes one or more processing circuits. For aspects where the computing system 200 includes more than one computing device, the respective computing devices may be communicably coupled to one another. Although only first, second, third, fourth, fifth and sixth modules/algorithms 210-255 are shown in FIG. 5, it will be appreciated the master control system 90 may include any number of modules/algorithms.

The processing circuit 280 may be, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field-programmable gate array (FPGA)), state machine circuitry, firmware that stores instructions executed by programmable circuitry, and any combination thereof. The processing circuit 82 may, collectively or individually, be embodied as circuitry that forms part of a larger system, for example, an integrated circuit (IC), an application-specific integrated circuit (ASIC), a system-on-chip (SoC), desktop computers, laptop computers, tablet computers, servers, smartphones, etc. Accordingly, the processing circuit 280 may include, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The memory circuit 270 is electrically coupled to the processing circuit 280 and may include more than one type of memory. For example, according to various aspects, the memory circuit 270 may include volatile memory and non-volatile memory. The volatile memory can include random access memory (RAM), which can act as external cache memory. According to various aspects, the random access memory can be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM), direct Rambus random access memory (DRRAM) and the like. The non-volatile memory can include read-only memory (ROM), programmable read-only memory (PROM), electrically programmable read-only memory, electrically erasable programmable read-only memory (EEPROM), flash memory and the like. According to various aspects, the memory circuit 84 can also include removable/non-removable, volatile/non-volatile storage media, such as for example disk storage. The disk storage can include, but is not limited to, devices like a magnetic disk drive, a floppy disk drive, a tape drive, a Jaz drive, a Zip drive, a LS-60 drive, a flash memory card, or a memory stick. In addition, the disk storage can include storage media separately or in combination with other storage media including, but not limited to, an optical disc drive such as a compact disc ROM device (CD-ROM), a compact disc recordable drive (CD-R Drive), a compact disc rewritable drive (CD-RW Drive), a digital versatile disc ROM drive (DVD-ROM) and the like.

According to various aspects, the first module/algorithm 210 is configured to determine how changes to an image to be captured by the camera 21 would be affected based on adjustments made to parameters associated with a source image (e.g., the output of the image decoder 71 or of the image generator 72). The second module/algorithm 220 is configured to determine how changes to an image to be captured by the camera 21 would be affected based on adjustments made to parameters associated with the display settings (e.g., settings of the display controller 74 or the display devices 100). The third module/algorithm 230 is configured to determine how changes to an image to be captured by the camera 21 would be affected based on adjustments made to parameters associated with the camera 21 (e.g., settings of the camera 21 and/or the Camera System 20). According to various aspects, the fourth module/algorithm 240 is configured to determine which of the three "adjustments" results in the least destruction to the image to be captured by the camera 21. The fourth module/algorithm 240 may utilize a lookup table to assist in the determination of which of the three "changed" images results in the least destruction to the image captured by the camera 21. According to various aspects, the fifth module/algorithm 250 is configured to save the settings of various components of the system 10 as metadata on a frame-by-frame basis. According to various aspects, the sixth module/algorithm 255 is configured to generate an index system, where each captured frame is associated with a unique index.

In additional to the above-described functionalities, the modules/algorithms of the master control system 90 are further configured to provide the following: the ability for the system 10 to influence imagery coming from the image decoder 71 and/or the image generator 72 with direct correlation to the characteristics of the camera system 20 relating to field-of-view, focus, exposure and lens distortion characteristics associated with a state of the camera system 20 in such a manner that the imagery being displayed on the display devices 100 emulate those same characteristics both within and beyond the frustum of the camera 21; (2) the ability for the system 10 to have full control over the color representation displayed on the display devices 100 via the master control system 90 utilizing the control devices 60; (3) the ability for the system 10 to have full control over the color pipeline of the camera 21 via the master control system 90 utilizing the control devices 60; (4) the ability for the system 10 to have control over the out of frustum portions of the display devices 100 through adjustments made to the display devices 100 by affecting the image characteristics of the image decoder 71 and/or the image generator 72 in a manner consistent with any visual states which are physically or artificially generated; (5) the ability for the system 10 to record all metadata changes on set on a frame-by-frame basis; and (6) the ability for the system 10 to concurrently capture imagery from multiple Cameras 21, with each camera 21 able to experience a unique point of view based on the frame state of the display devices 100 in conjunction with a frame offset calculation of the camera system 20 so that unique points of view being captured by a given camera 21 receive imagery from the image display system 70 which properly corresponds to the given camera's point of view.

The modules/algorithms 210-255 of the master control system 90 may be implemented in hardware, firmware, software (algorithms) and in any combination thereof. Software aspects may utilize any suitable computer language (e.g., C, C++, Java, JavaScript, Python, etc.) and may be embodied permanently or temporarily in any type of machine, component, physical or virtual equipment, storage medium, or propagated signal capable of delivering instructions to a device. The modules 210-255 may be stored on a computer-readable medium (e.g., disk, device, and/or propagated signal) such that when a computer reads the medium, the functions described herein are performed. The above-described functionality of the modules/algorithms 210-255 may be combined into fewer modules, distributed differently amongst the modules, spread over additional modules, etc.

In view of the above, it will be appreciated the master control system 90 communicably connects to each subsystem/component of the system 10 to monitor and affect the system 10. Within the master control system 90, all adjustments are stored as metadata that is directly associated with each captured image so that recalling either the image or the metadata record can provide feedback to any user of the system 10 which is an accurate representation of the state that all the subsystems/components of the system 10 were operating at during the time of each image capture. It will also be appreciated the master control system 90 may be configured to be multi-master and multi-editor. Each node within the master control system 90 can report, store, and affect each state within the system 10. A node can become a replica of the rest of the master control system 90 and a potential master for the master control system 90. When nodes become disconnected from the master control system 90, their roles can be automatically assumed by the other nodes of the master control system 90. Changes or adjustments made to one node can be reflected in all other nodes.

Figure 6:
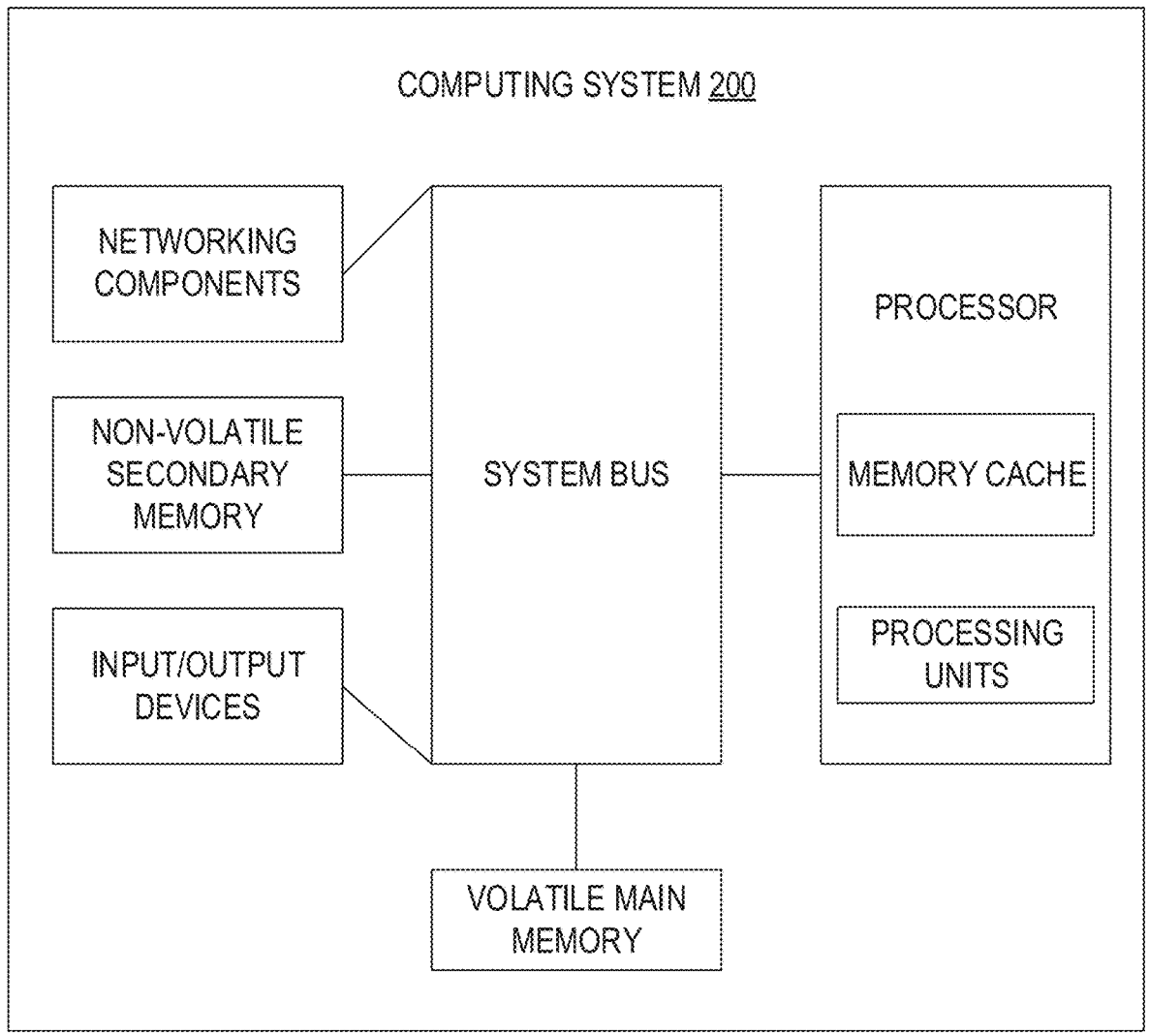
FIG. 6 illustrates a master control system of the system of FIG. 1, in accordance with at least one other aspect of the present disclosure.

FIG. 6 illustrates the computing system 200, in accordance with at least one aspect of the present disclosure. According to various aspects, the computing system 200 may be embodied as one or more computing devices and includes networking components such as ethernet adapters or wireless network adapters, non-volatile secondary memory such as magnetic disks, input/output devices such as keyboards and displays, volatile main memory, and one or more processors/processing circuits. Each of these components may be communicably connected via a common system bus. The processor includes processing units and on-chip storage devices such as memory caches. The computing system 200 includes one or more modules/algorithms which are implemented in software, and the software is stored in non-volatile memory devices while not in use. When the software is needed, the software is loaded into volatile main memory. After the software is loaded into volatile main memory, the processor reads software instructions from volatile main memory and performs useful operations by executing sequences of the software instructions on data that is read into the processor from volatile main memory. Upon completion of the useful operations, the processor writes certain data results to volatile main memory.

Figure 7:
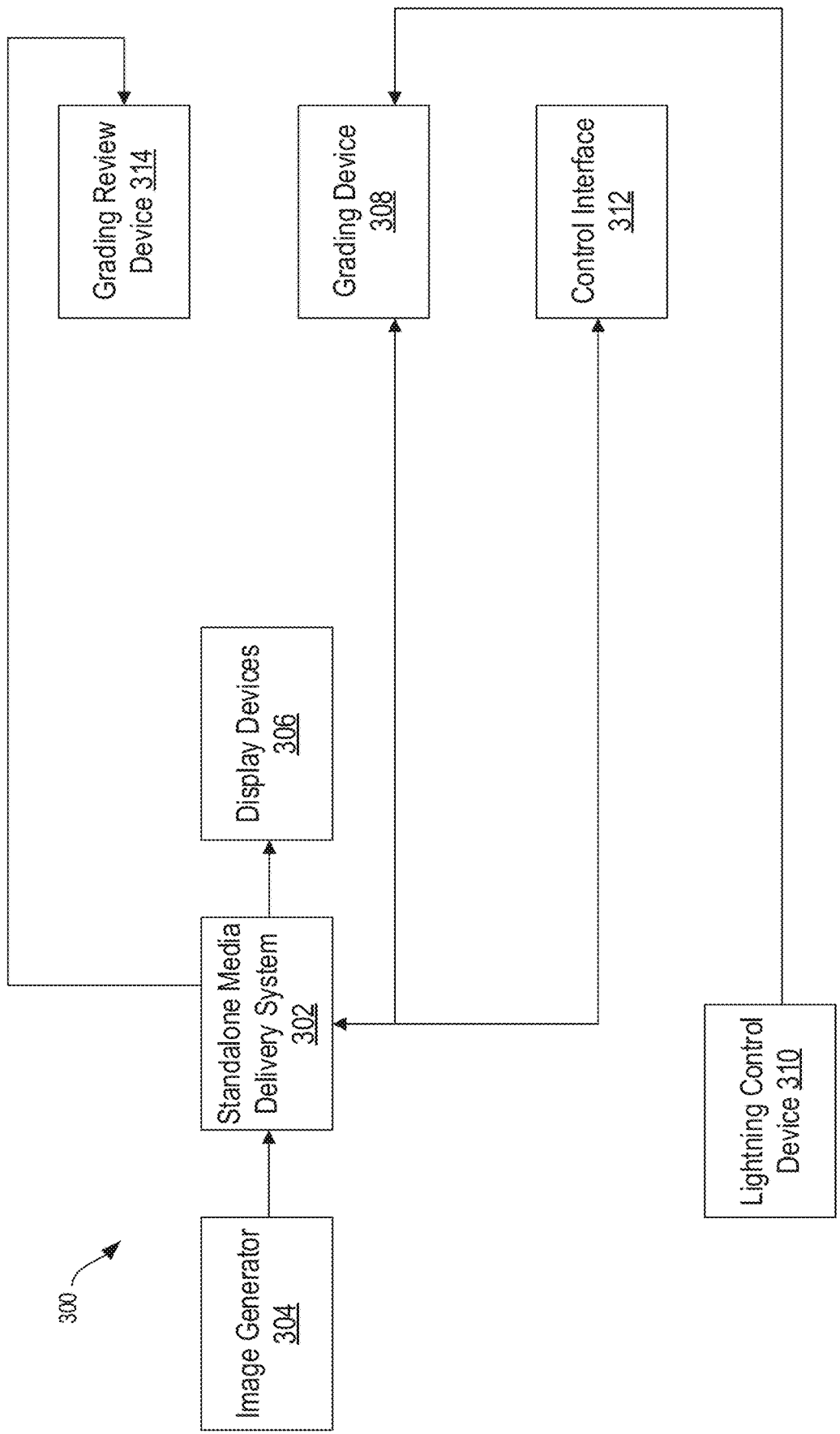
FIG. 7 illustrates a system for visual enhancement of a scene during the capture of the scene, in accordance with at least one other aspect of the present disclosure.

FIG. 7 illustrates a system 300 for visual enhancement of a scene during the capture of the scene, in accordance with at least one other aspect of the present disclosure. The system 300 includes a standalone media delivery system 302, an image generator 304, display devices 306, a grading device 308, a lighting control device 310, a control interface 312, and a grading review device 314. The system 300 provides a functionality that is like the functionality of the system 10 but does so with fewer components and with a smaller footprint.

The image generator 304, the display devices 306, the grading device 308, the lighting control device 310, the control interface 312, and the grading review device 314 may be similar or identical to the image generator 72, the display devices 100, the grading device 61, the lighting control device 62, the control interface 63 and the grading review device 81, respectively.

The media delivery system 302 may be in the form of a smart device (e.g., a smartphone, a tablet, and the like) which includes one or more cameras, processing circuitry, memory circuitry, has features such as depth sensing, optical identifications, and the like, and can be configured to execute algorithms/software associated with the capture of images, as well as the processing and/or editing of the captured images.

Figure 8:
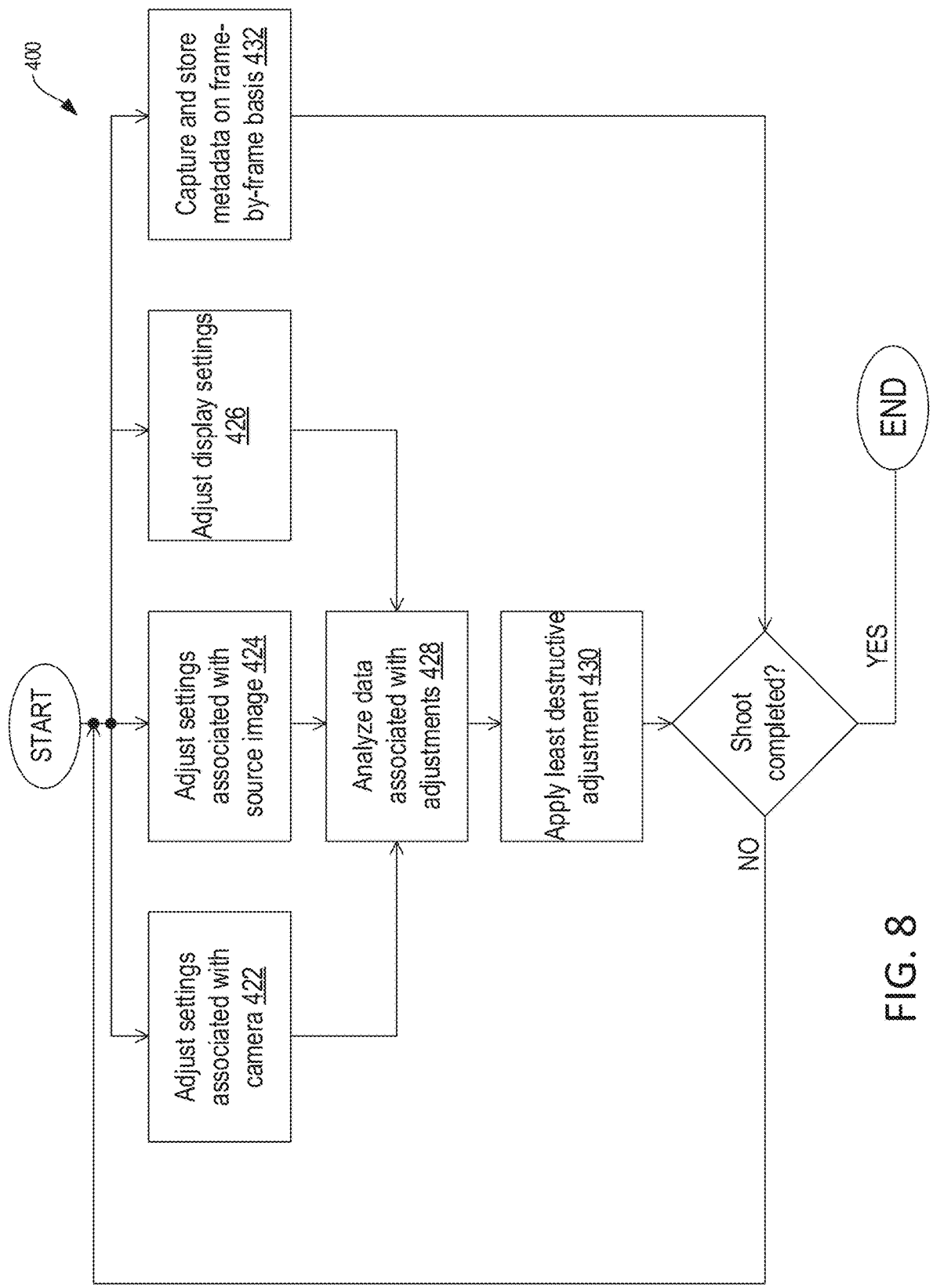
FIG. 8 illustrates a method for visually enhancing a scene during a capture of the scene, in accordance with at least one aspect of the present disclosure.

FIG. 8 illustrates a method 400 for visually enhancing a scene during the capture of the scene, in accordance with at least one other aspect of the present disclosure. The method 400 may be implemented by any suitable system or device. For purposes of simplicity, the method 400 will be described in the context of being implemented by the system 10. Once an image displayed on the display devices 100 has been captured by the camera 21, on-site personnel may view the captured image and decide to enhance the image on-site such that the enhanced image is subsequently displayed on the display devices 100 and subsequently captured by the camera 21. Such enhancement can be initiated, for example, by moving a knob or slider of one of the control devices 60, which results in a signal output by the respective control device. The master control system 90 recognizes the movement of the knob or slider, and automatically determines how one or more settings (e.g., brightness, iris up or down, etc.) associated with the image display system 70, the display devices 100 and or the camera system 20 should be adjusted in order for the image ultimately captured by the camera 21 to reflect the desired enhanced image. In some instances, the master control system 90 may adjust one or more settings of each of the image display system 70, the display devices 100 and the camera system 20 in order for the desired enhanced image to be realized. In other instances, the master control system 90 may adjust one of more settings of only one or two of the image display system 70, the display devices 100 and the camera system 20 in order for the desired enhanced image to be realized. For purposes of simplicity, the method 400 will be described in the context of the master control system 90 adjusting one or more of the settings of each of the image display system 70, the display devices 100 and the camera system 20 in order for the desired enhanced image to be realized.

As shown in FIG. 8, the method 400 includes adjusting 422 one or more settings associated with the camera 21 and/or the camera system 20, adjusting 424 one or more settings associated with a source image (e.g., an image output by the image decoder 71 or the image generator 72, or an image associated with the image delivery system 73), and adjusting 426 one or more settings associated with the display controller 74 and/or the display devices 100. The adjustments 422, 424, 426 are automatically made by the master control system 90 responsive to an output signal from one of the control devices 60, and can be performed sequentially or concurrently in real-time. The results of the adjustments 424 would become visible to a preview display showing the adjusted source image. This allows an on-site colorist to review the results on a display used for grading but keep the capture within the camera 21 as intact as possible. The method 400 also includes analyzing 428 data associated with the adjustments 422, 424, 426. According to various aspects, the analyzing 428 includes determining how the respective adjustments 422, 424, 426 would affect a captured image (i.e., an enhanced image to be subsequently captured by the camera 21) and utilizing a lookup table to determine which one of the adjustments 422, 424, 426 will result in the least destruction to the captured image. The method 400 further includes applying 430 the adjustment determined to be the least destructive. For example, if the adjustment 422 is determined to be less destructive than the adjustments 424, 426, the master control system 90 will apply the adjustment 422 to the settings associated with the camera 21 and/or the camera system 20 and will not apply the adjustment 424 to settings associated with the source image or the adjustment 426 to the display settings.

Additionally, the method 400 also includes capturing and storing 432 the settings of various components of the system 10 as metadata on a frame-by-frame basis. Such capturing and storing 432 can be performed concurrently with any of steps 422, 424, 426, 428 and/or 430. Since this metadata is stored, it means the image ultimately captured by the camera 21 is as unbiased as possible, thereby being non-destructive to the capture. The image ultimately captured by the camera 21 can be considered unbiased, and later in post-production, editors would be able to apply the lookup table and the metadata settings to see the same results the onsite colorist was trying to achieve. The editors would then have the discretion to keep the captured image intact or to make other adjustments to the captured image on a frame-by-frame basis. The steps 422-432 may be repeated any number of times as needed for any number of shoots, and the steps 422-432 may be initiated each time on-site personnel initiates a desired change to the captured image by, for example, by moving a knob, a slider, etc. of one of the control devices 60, which results in a signal output by the respective control device.

FIG. 9 illustrates multiple variations of a computing system 500 utilized as the image decoder 71, the image generator 72 and/or the image delivery system 74, in accordance with at least one aspect of the present disclosure. The computing system 500 may include a plurality of physical or virtual devices 502. Each physical or virtual device 502 may include an application piece 504 and/or a controller application 506. As shown in FIG. 9, a first physical or virtual device 502 may include a plurality of application pieces 504 and a controller application 506. A second physical or virtual device 502 may include a single application piece 504. A third physical or virtual device 502 may include a control application 506. In general, each application piece 504 includes a decoder, a synchronizer and a color effector. In general, each controller application 506 includes a decoder, as well as a synchronization master and a color control. The synchronization master is communicably coupled with the respective synchronizers in the application pieces 504 and operates to ensure the physical or virtual devices 502 are synchronized with one another. The color control is communicably coupled with the respective color effectors to provide for uniform color control.

FIG. 10 illustrates device synchronization characteristics of the system 10, in accordance with at least one aspect of the present disclosure.

Figure 11:
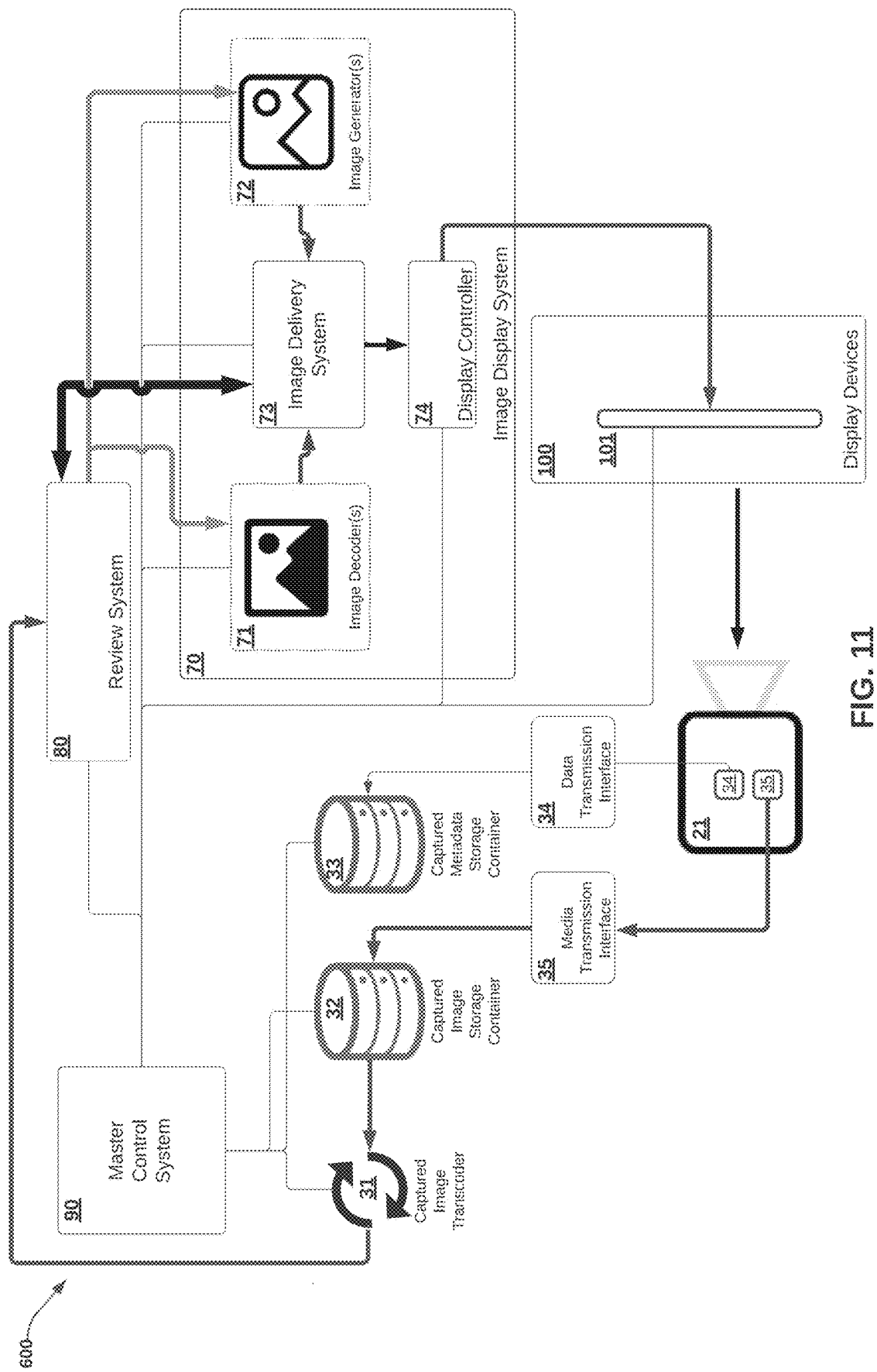
FIG. 11 illustrates a flow of image signals through the system of FIG. 1, in accordance with at least one aspect of the present disclosure.

FIG. 11 illustrates a flow 600 of image signals through the system 10, in accordance with at least one aspect of the present disclosure. FIG. 11 also illustrates the control system relationship of the non-destructive color adjustment process. As shown in FIG. 11, the image delivery system 73 passes an image/video file to be displayed on the display devices 100 to the review system 80, as well as to the display controller 74 which operates to display the image/video file on the display devices 100. The camera 21 captures the image/video file displayed on the display devices 100 and passes the captured image/video file to the media transmission interface 35, which passes the captured image/video file to the captured image storage container 32. The stored image/video file is passed to the captured image transcoder 31, or the captured image transcoder 31 accesses the captured image storage container 32 to convert or regenerate the image/video file stored at the captured image storage container 32. The converted or regenerated image/video file is then passed to the review system 80. The review system 80 may then pass the converted or regenerated image/video file to the image decoder 71, the image generator 72, or the image delivery system 73. Thus, FIG. 11 can be thought of as showing physical image signal flow and the control system relationship of the non-destructive color adjustment process of the system 10.

Figure 12:
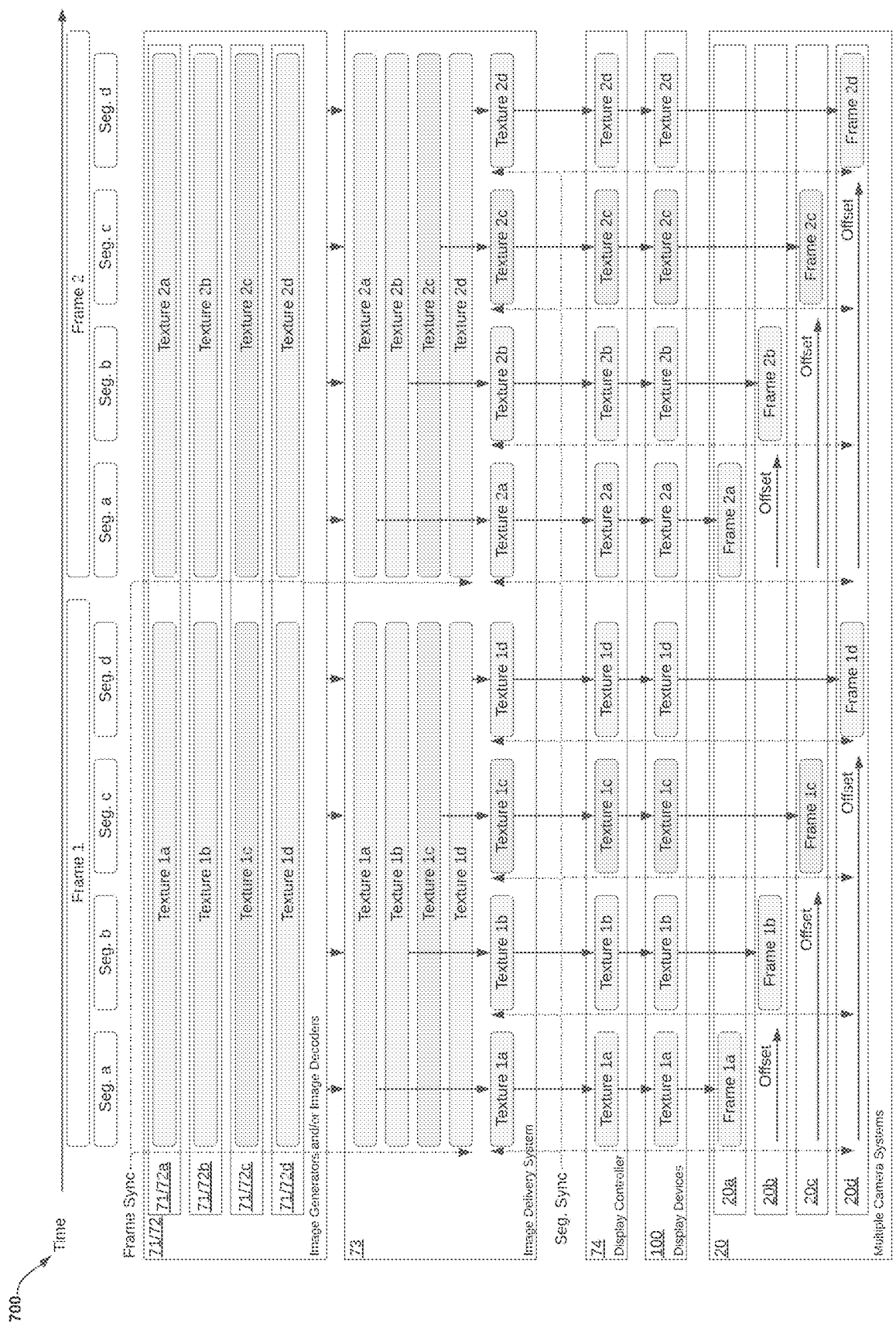
FIG. 12 illustrates a multi-camera process utilized by the master control system 90, in accordance with at least one other aspect of the present disclosure.

FIG. 12 illustrates a multi-camera process 700 utilized by the master control system 90, in accordance with at least one other aspect of the present disclosure. The master control system 90 utilizes the process 700 to pass textures to the display devices 100 in order to achieve an inter-frame multiplex that allows for multiple cameras 21 or multiple camera systems 20 to observe the display devices 100 from multiple points of view where the visual imagery being presented on the display devices 100 is properly aligned in time and orientation with each associated image captured by the cameras 21. Thus, FIG. 12 can be thought of as showing the flow of successive visual image textures or frames of video through a synchronized image and camera multiplexing system.

Figure 13:
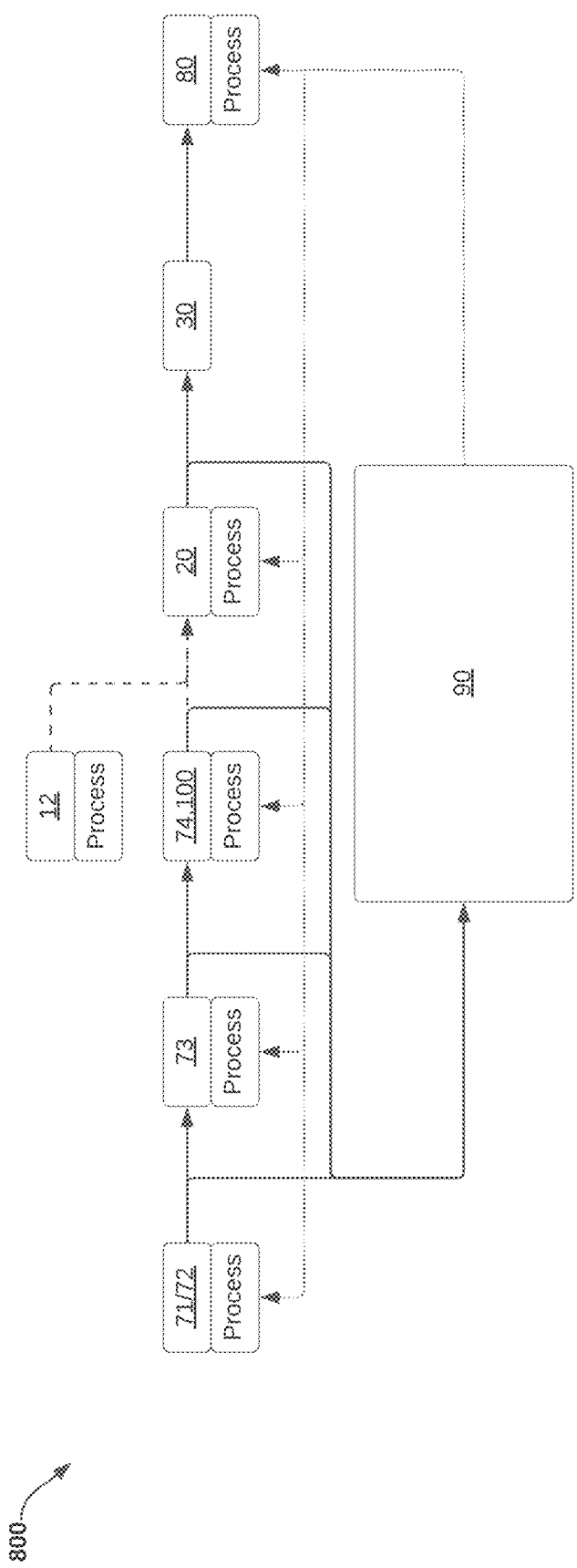
FIG. 13 illustrates a communication process utilized by a master control system of the system of FIG. 1, in accordance with at least one aspect of the present disclosure.

FIG. 13 illustrates a communication process 800 utilized by the master control system 90, in accordance with at least one aspect of the present disclosure. For the communication process shown in FIG. 13, the camera 21 is used to capture the light and color characteristics of the display devices 100 so that evaluation of the perceived color can be used to adjust each subsystem/component in the image path beginning with the image decoders 71 and/or the image generators 72. The color characteristics, intensity, and any adjustments are monitored by the master control system 90 at each state in the image pipeline of all image affecting subsystems/devices. The initial image is generated within the decoding mechanism present in the image decoder 71 and/or within the image generator 72 and has a known specific value that is used as a reference state. The image is passed into the image delivery system 73 where an audit is performed by the master control system 90 and the results are compared to the reference state. The image is passed from the image delivery system 73 to the display controller 74 where another audit is performed by the master control system 90 and compared to the reference state. The image is passed from the display controller 74 to the display devices 100 at which point the camera 21 is used to perform another audit. The audit from the camera 21 is compared to the reference state. Through all steps of the image pipeline the image audits are collected and compared with computer vision algorithms running within the master control system 90. The results of the image comparisons are then passed as adjustment parameters back to each respective subsystem/component to affect the subsystem/component to achieve an accurate non-destructive result where the audited image is set to be identical to the reference image.

The computer vision algorithms that are present within the master control system 90 are designed to provide unified adjustment within the review system 80. The parameter controls within the review system 80 are delivered to the master control system 90 where the computer vision algorithm accurately adjusts each device within the pipeline proportionately to perform a non-destructive augmentation to the image. Thus, FIG. 13 can be thought of as showing the color pipeline process of a non-destructive color adjustment process.

In view of the above, the system 10 may be thought of as a non-destructive color system. According to various aspects, the system 10 measures the values and relationship of image color and intensity variations at multiple points throughout the system 10 and creates a color profile that can be compared to each state throughout the system 10. The color profile may be determined by evaluating the color intensity values observed entering and exiting each subsystem/component throughout the system 10. The profile creation process may be done by measuring the intensity of each color channel within the system 10 from its minimum possible value to maximum possible value and comparing those measurements to the values reported by each subsystem/component in the transmission pipeline of the system 10. Once this profile is recorded, it may treated as the baseline state that can be referenced throughout all adjustments. When an adjustment is made to a given image texture, the system 10 can evaluate what has been changed and report back whether the change has had a destructive effect on the integrity of the overall texture colors. A destructive effect is interpreted as anything that clips a high or low value and/or reduces the ratio of resolution within that image texture. The modules/algorithms within the master control system 90 are configured to perform a comparative analysis of each state. When an operator performs an adjustment to the color of the image texture, the adjustment can be evaluated by the system 10. The modules/algorithms within the master control system 90 determine which of the color changes result in the least destruction to the image captured by the camera 21 and thus the point in the process pipeline to make the color adjustment.

As described above, an image texture within the system 10 comprises pixels with intensity values that correspond to each color channel. The respective image textures within the system 10 may be considered to be raw textures. According to various aspects, the system 10 utilizes a modeled intensity curve to affect these raw texture values. When a raw texture is passed from one subsystem/component of the system 10 to another subsystem/component of the system 10, multiple intensity curves may be applied to the raw texture. Each introduction of a new curve has the potential to introduce a loss of detail and resolution to the fundamental raw texture. These curves can be modeled mathematically and therefore at any given time, an observation of the image pathway of the system 10 can inform the system 10 as to whether or not these curves have reduced the resolution of the texture. During the color grading process, one of these color profiles is chosen and applied to the image to produce a given result. Each time a color profile is applied to a texture it has the capability of decreasing the intensity resolution potential of that texture. The system 10 conducts observations along every step of the color process within every subsystem/component of the system 10 which handles the image in order to determine if a reduction in quality or resolution is taking place. Since the system observes all states, a change to one subsystem/component can be remodeled and performed at another state in a different subsystem/component in order to eliminate the loss in resolution. The master control system 90 is configured to evaluate the intensity levels of each texture at each step in the color chain in order to determine what kind of color profile can be applied at any step in the chain so as not to decrease the resolution of the represented intensities of those textures.

Figure 14:
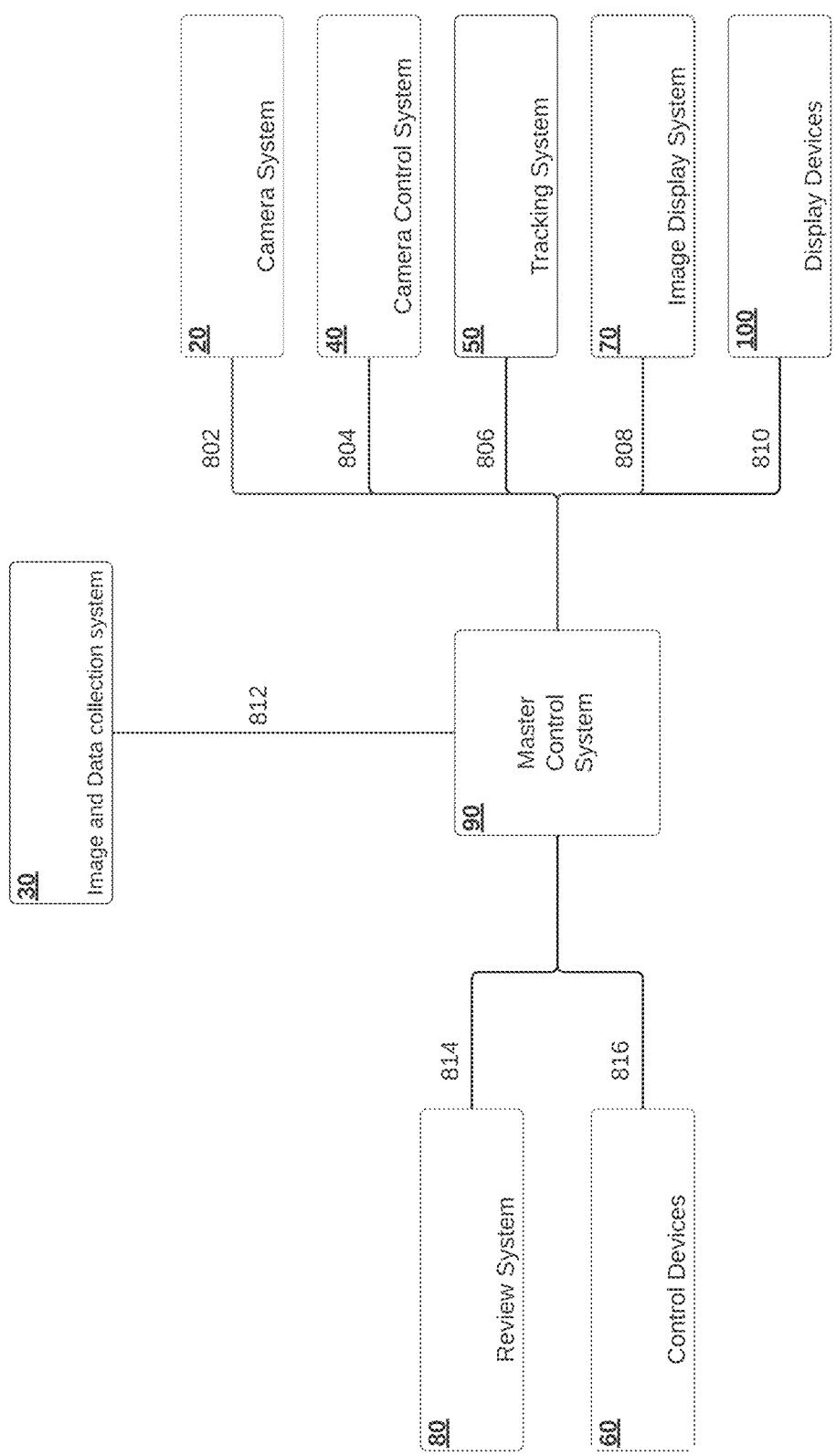
FIG. 14 illustrates metadata communication channels utilized by the system of FIG. 1 to carry out the communication process of FIG. 13, in accordance with at least one aspect of the present disclosure.

FIG. 14 illustrates metadata communication channels 802-816 utilized by the system 10 to carry out the communication process 800 of FIG. 13, in accordance with at least one aspect of the present disclosure.

EXAMPLES

Example 1—A system for visual enhancement of a scene during a capture of the scene is provided. The system comprises an image display system, a display device configured to display an image received from the image display system, a camera system configured to capture the image displayed by the display device during the capture of the scene, one or more control devices, and a control system communicably coupled to the image display system, the display device, the camera system and the one or more control devices. The control system comprises a processing circuit and is configured to automatically adjust at least one of the following responsive to a signal output by the one or more control devices: (1) a setting of the image display system; (2) a setting of the display device; and (3) a setting of the camera system. The control system is also configured to determine which of the adjustments results in the least destruction to the image, and apply the adjustment which results in the least destruction to the image.

Example 2—The system of Example 1, wherein the image display system comprises a display controller, an image delivery system; and at least one of (1) an image decoder and (2) an image generator.

Example 3—The system of Examples 1 or 2, wherein the display device comprises at least one of the following: a light emitting diode display, a video projector, a liquid crystal display, a spot lighting device and an ambient lighting device.

Example 4—The system of Examples 1, 2 or 3, wherein the system comprises a plurality of display devices.

Example 5—The system of Examples 1, 2, 3 or 4, wherein the camera system comprises one or more cameras.

Example 6—The system of Example 5, wherein the camera system further comprises at least one of the following: (1) a camera control system communicably coupled with the control system and (2) a tracking system communicably coupled with the control system.

Example 7—The system of Example 6, wherein the camera control system comprises at least one of the following: (1) an optical internal control of the camera, (2) an optical external control of the camera and (3) a positional and mechanical control of the camera.

Example 8—The system of Examples 6 or 7, wherein the tracking system comprises at least one of the following: (1) a camera tracker and (2) an object tracker.

Example 9—The system of Examples 1, 2, 3, 4, 5, 6, 7 or 8, wherein the one or more control devices comprises at least one of the following: (1) a grading device, (2) a lighting control device and (3) a control interface.

Example 10—The system of Examples 1, 2, 3, 4, 5, 6, 7, 8 or 9, wherein the control system is further figured to save one or more settings of at least one of the following as metadata on a frame-by-frame basis: (1) the image display system, (2) the display device, (3) the camera system and (4) the one or more control devices.

Example 11—The system of Examples 1, 2, 3, 4, 5, 6, 7, 8, 9 or 10, further comprising an image and data collection system communicably coupled to the camera system and the control system, wherein the image and data collection system is configured to (1) store images captured by the camera system on a frame-by-frame basis and (2) store metadata associated with captured images on the frame-by-frame basis.

Example 12—The system of Example 11, further comprising a review system communicably coupled to the image and data collection system and the control system, wherein the review system comprises a grading review device and one or more monitoring devices.

Example 13—The system of Example 12, wherein a first one of the one or more monitoring devices is configured to display the image captured by the camera in a first format, and a second one of the one or more monitoring devices is configured to display the image captured by the camera in a second format. The first format is different from the second format.

Example 14—A method for visually enhancing a scene during a capture of the scene is provided. The method comprises initiating a desired change to an image displayed on a display device, determining how one or more settings of one or more systems should be adjusted in order to realize the desired change, determining which of the setting adjustments results in the least destruction to another image representative of the desired change, applying the setting adjustment which results in the least destruction to the another image to one of the one or more systems and displaying the another image on the display device.

Example 15—The method of Example 14, wherein initiating the desired change comprises changing a position of a mechanism of a control device.

Example 16—The method of Examples 14 or 15, wherein determining how the one or more settings of the one or more systems should be adjusted comprises automatically determining how the one or more settings of the one or more systems should be adjusted in order to realize the desired change.

Example 17—The method of Example 16, wherein determining how the one or more settings of the one or more systems should be adjusted further comprises automatically recognizing a changing of a position of a mechanism of a control device.

Example 18—The method of Examples 14, 15, 16 or 17, wherein determining which of the setting adjustments results in the least destruction comprises utilizing a look-up table.

Example 19—The method of Examples 14, 15, 16, 17 or 18, further comprising capturing the another image with a camera.

Example 20—A system for visual enhancement of a scene during a capture of the scene is provided. The system comprises an image display system, a display device configured to display an image received from the image display system, a camera system configured to capture the image displayed by the display device during the capture of the scene, one or more control devices, and a control system communicably coupled to the image display system, the display device, the camera system and the one or more control devices. The control system comprises means for automatically adjusting at least one of the following responsive to a signal output by the one or more control devices: (1) a setting of the image display system; (2) a setting of the display device; and (3) a setting of the camera system. The control system also comprises means for determining which of the adjustments results in the least destruction to the image, and applying the adjustment which results in the least destruction to the image.

Although the various aspects of the system 10 and the system 300 (and the related methods) have been described herein in connection with certain disclosed aspects, many modifications and variations to those aspects may be implemented. Also, where materials are disclosed for certain components, other materials may be used. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a movie shoot, the general principles of the invention are equally applicable to other types of shoots such as video shoots, commercials, television broadcasts, etc.

Any patent, patent application, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system for visual enhancement of a scene during a capture of the scene, the system comprising:
    an image display system;
    a display device, at a location, configured to display an image received from the image display system;
    a camera system, at the location, configured to capture the image displayed by the display device during the capture of the scene;
    one or more control devices;
    a control system communicably coupled to the image display system, the display device, the camera system and the one or more control devices, wherein the control system comprises a processing circuit and is configured to:
        automatically adjust, responsive to a signal output by the one or more control devices, at least one of:
            a setting of the image display system,
            a setting of the display device, or
            a setting of the camera system,
        determine which adjustment results in least destruction to the image, wherein a destruction to the image comprises at least one of an effect that clips a value above or below a threshold, or an effect that reduces a ratio of resolution within the image; and
        apply the determined adjustment that results in the least destruction to the image.

2. The system of claim 1, wherein the image display system comprises:
    a display controller;
    an image delivery system; and at least one of:
        an image decoder, or
        an image generator.

3. The system of claim 2 wherein the image decoder is a repository for components that make up source images, wherein the image decoder is configured to extract source image components and combine or compose then into a larger image communicated to the image display system as an image stream.

4. The system of claim 2 wherein the image generator is configured to compose components into a single image stream that is communicated to the image display system, and wherein the image generator includes a series of generative engines which create virtual environments that relate to the scene based on a perspective of the camera system, based on a relationship between a relative location of the camera system relative to the scene in both real and virtual space.

5. The system of claim 1, wherein the display device comprises at least one of:
    a light emitting diode display,
    a video projector,
    a liquid crystal displays,
    a spot lighting device, or
    an ambient lighting device.

6. The system of claim 1, wherein the system comprises a plurality of display devices.

7. The system of claim 1, wherein the camera system comprises at least one camera.

8. The system of claim 7, wherein the camera system further comprises at least one of:
    a camera control system communicably coupled with the control system, or
    a tracking system communicably coupled with the control system.

9. The system of claim 8, wherein the camera control system comprises at least one of:
    an optical internal control of the at least one camera,
    an optical external control of the at least one camera, or
    a positional and mechanical control of the at least one camera.

10. The system of claim 8, wherein the tracking system comprises at least one of:
a camera tracker, or
an object tracker.

11. The system of claim 1, wherein the one or more control devices comprises at least one of:
a grading device,
a lighting control device, or
a control interface.

12. The system of claim 1, wherein the control system is further figured to save, as metadata on a frame-by-frame basis, one or more settings of at least one of:
the image display system,
the display device,
the camera system, or
the one or more control devices.

13. The system of claim 1, further comprising an image and data collection system communicably coupled to the camera system and the control system, wherein the image and data collection system is configured to:
store images captured by the camera system on a frame-by-frame basis; and
store metadata associated with captured images on the frame-by-frame basis.

14. The system of claim 13, further comprising a review system communicably coupled to the image and data collection system and the control system, wherein the review system comprises:
a grading review device; and
one or more monitoring devices.

15. The system of claim 14, wherein:
a first one of the one or more monitoring devices is configured to display the image captured by the camera system in a first format; and
a second one of the one or more monitoring devices is configured to display the image captured by the camera system in a second format, wherein the first format is different from the second format.

16. The system of claim 1, further comprising a color grading device at the location and in communication with the camera system, wherein the color grading system is for allowing a person at the location to adjust a color parameter of video captured by the camera system on a frame-by-frame basis.

17. The system of claim 16, the camera system records video in a logarithmic profile and provides a logarithmic profile video output to the color grading device.

18. The system of claim 16, further comprising a grading review device in communication with the control system, wherein the grading review device is for determining whether an adjustment by the color grading system is sufficient.

19. A method for visually enhancing a scene during a capture of the scene, the method comprising:
initiating a desired change to an image displayed on a display device at a location;
determining how one or more settings of one or more systems at the location should be adjusted in order to realize the desired change;
determining which one or more setting adjustments to the one or more settings results in least destruction to another image representative of the desired change;
applying the one or more setting adjustments to the one or more settings which result in the least destruction to the other image, wherein a destruction to the image comprises at least one of an effect that clips a value above or below a threshold, or an effect that reduces a ratio of resolution within the image; and
displaying the other image on the display device.

20. The method of claim 19, wherein initiating the desired change comprises:
changing a position of a mechanism of a control device.

21. The method of claim 19, wherein the determining how the one or more settings of the one or more systems should be adjusted comprises automatically determining how the one or more settings of the one or more systems should be adjusted in order to realize the desired change.

22. The method of claim 21, wherein the determining how the one or more settings of the one or more systems should be adjusted further comprises automatically recognizing a changing of a position of a mechanism of a control device.

23. The method of claim 19, wherein the determining which of the one or more setting adjustments results in the least destruction comprises utilizing a look-up table.

24. The method of claim 19, further comprising:
capturing the other image with a camera.

25. A system for visual enhancement of a scene during a capture of the scene, the system comprising:
an image display system;
a display device at a location, configured to display an image received from the image display system;
a camera system, at the location, configured to capture the image displayed by the display device during the capture of the scene;
one or more control devices;
a control system communicably coupled to the image display system, the display device, the camera system and the one or more control devices, wherein the control system comprises means for:
automatically adjusting, responsive to a signal output by from the one or more control devices at least one of:
a setting of the image display system,
a setting of the display device, or
a setting of the camera system;
determining which adjustment results in least destruction to the image, wherein a destruction to the image comprises at least one of an effect that clips a value above or below a threshold, or an effect that reduces a ratio of resolution within the image; and
applying the adjustment which results in the least destruction to the image.

* * * * *